(12) United States Patent
Asbe et al.

(10) Patent No.: US 10,514,943 B2
(45) Date of Patent: Dec. 24, 2019

(54) METHOD AND APPARATUS FOR ESTABLISHING SYSTEM-ON-CHIP (SOC) SECURITY THROUGH MEMORY MANAGEMENT UNIT (MMU) VIRTUALIZATION

(71) Applicant: QUALCOMM Incorporated, San Diego, CA (US)

(72) Inventors: Samar Asbe, San Diego, CA (US); Qazi Bashir, San Marcos, CA (US); Vipul Gandhi, San Diego, CA (US); Chris Henroid, San Diego, CA (US); Mitchel Allen Humpherys, Poway, CA (US); Olav Haugan, San Diego, CA (US); Daren Hall, San Diego, CA (US); Adam Openshaw, San Diego, CA (US); Priyesh Sanghvi, Westminster, CO (US); Brijen Raval, Boulder, CO (US)

(73) Assignee: QUALCOMM Incorporated, San Diego, CA (US)

( * ) Notice: Subject to any disclaimer, the term of this patent is extended or adjusted under 35 U.S.C. 154(b) by 507 days.

(21) Appl. No.: 15/354,791

(22) Filed: Nov. 17, 2016

(65) Prior Publication Data

US 2018/0136967 A1 May 17, 2018

(51) Int. Cl.
*G06F 9/455* (2018.01)
*G06F 21/53* (2013.01)
*G06F 21/79* (2013.01)

(52) U.S. Cl.
CPC .......... *G06F 9/45558* (2013.01); *G06F 21/53* (2013.01); *G06F 21/79* (2013.01); *G06F 2009/45587* (2013.01)

(58) Field of Classification Search
CPC ...... G06F 9/468; G06F 9/45558; G06F 21/53; G06F 21/79
See application file for complete search history.

(56) References Cited

U.S. PATENT DOCUMENTS

| 8,826,391 | B2 | 9/2014 | Tkacik et al. | |
|---|---|---|---|---|
| 9,152,223 | B2 | 10/2015 | Cohn et al. | |
| 2007/0168641 | A1* | 7/2007 | Hummel | G06F 9/45558 711/206 |
| 2008/0104673 | A1* | 5/2008 | O'Connor | G06F 21/53 726/4 |

(Continued)

*Primary Examiner* — Hee K Song
(74) *Attorney, Agent, or Firm* — Loza & Loza, LLP; Robert A. Reid

(57) ABSTRACT

In an aspect, an apparatus that includes a first security domain and at least a second security domain obtains, at a virtual machine of the first security domain, a stream identifier associated with the second security domain. The apparatus generates, at the virtual machine of the first security domain, a command to map the stream identifier associated with the second security domain to a first address translation context. The apparatus maps, at a hypervisor device, the first address translation context to a second address translation context that is associated with the second security domain of the stream identifier. The apparatus processes a stream of memory access transactions that includes the stream identifier based on at least the first address translation context or the second address translation context.

30 Claims, 12 Drawing Sheets

(56) References Cited

U.S. PATENT DOCUMENTS

| | | | |
|---|---|---|---|
| 2013/0013889 A1* | 1/2013 | Devaraj | G06F 12/1483 |
| | | | 711/207 |
| 2014/0281332 A1 | 9/2014 | Koob et al. | |
| 2015/0370592 A1 | 12/2015 | Tuch et al. | |
| 2016/0140059 A1* | 5/2016 | Snyder, II | G06F 13/4022 |
| | | | 710/113 |
| 2018/0173641 A1* | 6/2018 | Parker | G06F 12/1009 |
| 2019/0026231 A1* | 1/2019 | Kottilingal | G06F 12/1009 |

* cited by examiner

METHOD AND APPARATUS FOR ESTABLISHING SYSTEM-ON-CHIP (SOC) SECURITY THROUGH MEMORY MANAGEMENT UNIT (MMU) VIRTUALIZATION

INTRODUCTION

Field of the Disclosure

Aspects of the disclosure relate generally to a method and apparatus for establishing system-on-chip (SoC) security through memory management unit (MMU) virtualization.

BACKGROUND

In a system-on-chip (SoC) device, system memory management unit (SMMU) virtualization (also referred to as input/output memory management unit (IOMMU) virtualization) is standard for hypervisor devices configured to support multiple virtual machines that independently manage various master devices (also referred to as IO devices) and the stream IDs of the master devices. A hypervisor device may alternatively be referred to as a virtual machine manager (VMM)). A hypervisor device in SMMU virtualization merely needs to map a stream ID to a second stage context bank corresponding to the virtual machine that is programming or managing the stream ID. This helps ensure that all the virtual machines remain sandboxed (e.g., isolated) from one another.

When a hypervisor device is designed and deployed with the responsibility of managing the security of an SoC device, a rich operating system (which may be considered to be a non-secure virtual machine) may be allowed to act as a managing entity for all the security domains in the SoC device. In this configuration, a hypervisor device may need to allow a rich operating system to assign the stream IDs to other security domains in the SoC device and/or manage the stream IDs of other security domains. However, this may defeat the sandboxing between the domains/virtual machines since the rich operating system, which can be viewed as a non-secure managing virtual machine, may be compromised. For example, an unauthorized user (e.g., attacker, adversary, hacker, etc.) may be able to reconfigure the stream ID assignments of other virtual machines and enable modification, corruption, and/or theft of sensitive data residing in different security domains. Therefore, the standard system MMU virtualization in the above described configuration may not achieve an adequate or required level of security in an SoC device.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

In an aspect, a method for an apparatus is provided. The apparatus may include a first security domain and at least a second security domain. In one example implementation, the apparatus may be an integrated circuit in a system-on-chip (SoC) device. In another example implementation, the apparatus may be an electronic device (e.g., a mobile device, such as a smartphone, laptop computer, etc.). The apparatus may obtain, at a virtual machine of the first security domain, a stream identifier associated with the second security domain. The apparatus may generate, at the virtual machine of the first security domain, a command to map the stream identifier associated with the second security domain to a first address translation context. The apparatus may map, at a hypervisor device, the first address translation context to a second address translation context that is associated with the second security domain of the stream identifier. That apparatus may process a stream of memory access transactions that includes the stream identifier based on at least the first address translation context or the second address translation context.

In an aspect, the apparatus may identify, at the hypervisor device, a security domain of at least a second stream identifier already mapped to the first address translation context, and may validate, at the hypervisor device, the generated command when the security domain of at least the second stream identifier is the same as the second security domain.

In an aspect, the apparatus may prevent, at the hypervisor device, the virtual machine from mapping a second stream identifier associated with a third security domain to the first address translation context when the third security domain is different from the second security domain.

In an aspect, the apparatus may set, at the hypervisor device, a context bank attribute register to a fault value when a stream to context register corresponding to the context bank attribute register is empty.

In an aspect, the apparatus may include a single virtual machine, where the single virtual machine is the virtual machine of the first security domain.

In an aspect, the apparatus may validate, at the hypervisor device, the generated command to map the stream identifier when the generated command to map the stream identifier is a write instruction to modify an empty stream to context register. For example, the command may be a write instruction to modify one or more registers configured to control memory address translation regimes in a memory management unit (MMU).

In an aspect, the stream identifier is generated by a master device that is configured to generate a plurality of stream identifiers associated with different security domains.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Example Non-Virtualized System-On-Chip Architecture

Figure 1:
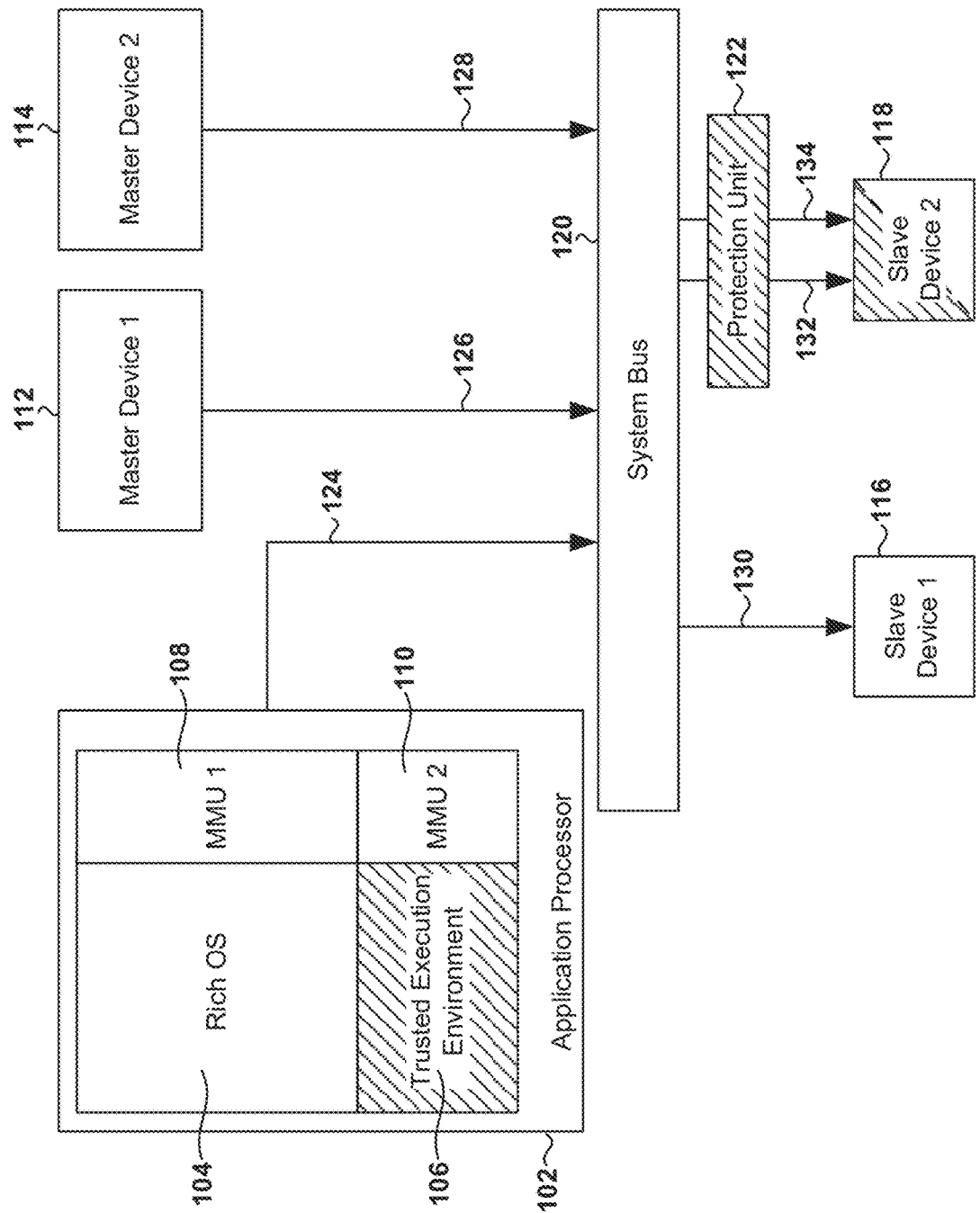
FIG. 1 illustrates a block diagram of an example non-virtualized system-on-chip (SoC) architecture.

FIG. 1 illustrates a block diagram of an example non-virtualized system-on-chip (SoC) architecture 100. In an aspect, the non-virtualized system-on-chip (SoC) architecture 100 may be implemented as an integrated circuit in an SoC device. As shown in FIG. 1, the architecture 100 may include an application processor (AP) 102, a first master device (also referred to as master device 1) 112, a second master device (also referred to as master device 2) 114, a first slave device (also referred to as slave device 1) 116, a second slave device (also referred to as slave device 2) 118, a system bus 120, and a protection unit 122. The application processor 102, the first master device 112, the second master device 114, the first slave device 116, the second slave device 118, and the protection unit 122 may be coupled to the system bus 120.

The application processor 102 may have multiple execution environments, such that the application processor 102 may operate in any one of the multiple execution environments at a given time. In other words, the application processor 102 may not be able to operate simultaneously in two or more execution environments. For example, the multiple execution environments may include a non-secure execution environment (also referred to as a non-secure domain) and a trusted execution environment (also referred to as a secure domain or a TrustZone®). In one example, the application processor 102 may run a rich operating system (OS) 104 (e.g., Windows® or Linux®) while operating in a non-secure execution environment and, therefore, may execute non-secure instructions (also referred to as non-secure software or non-secure code). In another example, the application processor 102 may switch to a trusted execution environment (TEE) 106 to execute secure instructions (also referred to as secure software or secure code).

The first master device 112 and the second master device 114 may perform work on behalf of the rich OS 104. For example, the first master device 112 and/or the second master device 114 may be a graphics processing unit (GPU), a Universal Serial Bus (USB) controller, a direct memory access (DMA) controller, or other appropriate master device. For example, the first slave device 116 and/or the second slave device 118 may be a memory device, a memory mapped input/output (I/O) device, or other suitable type of resource. In the example configuration of FIG. 1, the first slave device 116 and the second slave device 118 may be controlled by the first master device 112 and the second master device 114. For example, the first master device 112 may generate a memory transaction 126, such as a memory read operation, and may transmit the memory transaction 126 to the first slave device 116. The memory transaction 126 may then be transferred over the system bus 120 and received (e.g., as the signal 130) by the first slave device 116. As another example, the second master device 114 may generate a memory transaction 128, such as a memory write operation, and may transmit the memory transaction 128 to the second slave device 118. The memory transaction 128 may then be transferred over the system bus 120 and received (e.g., as the signal 132) by the second slave device 118.

In one example, when operating in the non-secure mode, the application processor 102 may generate a memory transaction 124 with respect to the first slave device 116 and/or the second slave device 118 in a manner similar to the first master device 112 or the second master device 114 as previously described. In another example, when the application processor 102 is operating in the secure mode, the memory transaction 124 from the application processor 102 may be a secure memory transaction generated by the trusted execution environment 106. For example, such secure memory transaction may be a read or write operation directed to secure resources (e.g., a secure memory region) of the second slave device 118. It should be noted that the slave device 2 118 is partly shaded with the same shading as the trusted execution environment 106 to indicate that the second slave device 118 may be controlled by the trusted execution environment 106 in addition to being controlled by the rich OS 104, the first master device 112, and/or the second master device 114. The memory transaction 124 may then be transferred over the system bus 120 and received (e.g., as the signal 134) by the second slave device 118. The protection unit 122 may be configured to allow or deny a transaction (e.g., the signal 132 or the signal 134) based on predetermined access permissions, attributes, etc. to ensure that transactions directed to a slave device (e.g., the second slave device 118) including secure resources are authorized.

When the rich OS 104 generates a transaction directed to a slave device (e.g., a memory device), such transaction may include a target memory address that is to be read from or written to at the slave device. The target memory address issued by the rich OS may be a virtual address. Accordingly, the first MMU 108 may convert the virtual address to a physical address (e.g., the actual address at the slave device based on one or more page tables) and may proceed to transmit the transaction with the physical address. Similarly, the second MMU 110 may convert a virtual address in a secure transaction generated by the trusted execution environment 106 to a physical address and may proceed to transmit the secure memory transaction with the physical address.

Example Virtualized System-On-Chip Architecture

Figure 2:
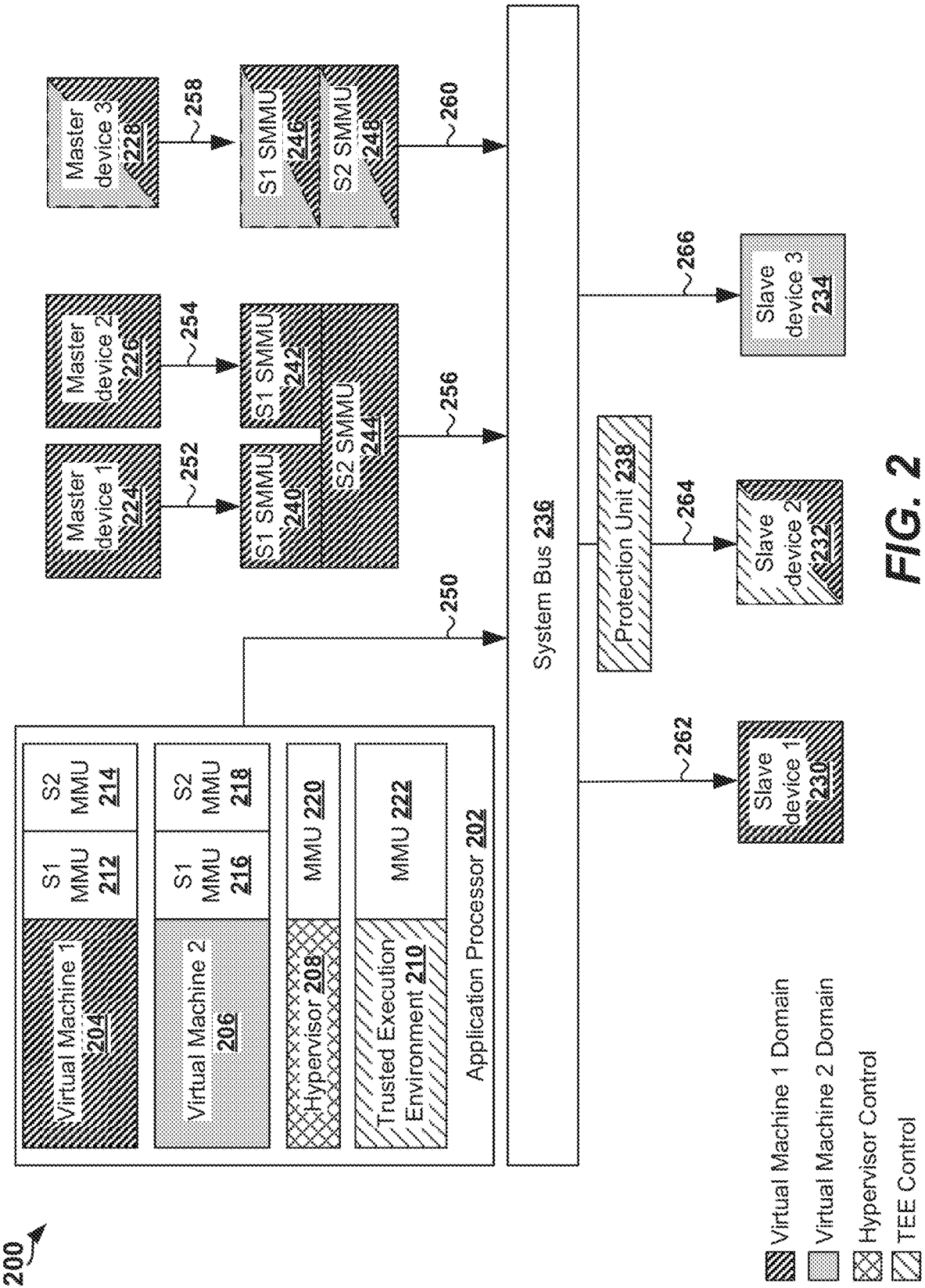
FIG. 2 illustrates a block diagram of an example virtualized SoC architecture.

FIG. 2 illustrates a block diagram of an example virtualized SoC architecture 200. In an aspect, the virtualized SoC architecture 200 may be implemented as an integrated circuit in an SoC device. As shown in FIG. 2, the architecture 200 may include an application processor (AP) 202, a first master device (also referred to as a master device 1) 224, a second master device (also referred to as a master device 2) 226, a third master device (also referred to as a master device 3) 228, a first slave device (also referred to as a slave device 1) 230, a second slave device (also referred to as slave device 2) 232, a third slave device (also referred to as slave device 3) 234, a system bus 236, and a protection unit 238. The application processor 202, the first master device 224, the second master device 226, the third master device 228, the first slave device 230, the second slave device 232, the third slave device 234, and the protection unit 238 may be coupled to the system bus 236.

The architecture 200 may further include a first stage (S1) system memory management unit (SMMU) 240 for the first master device 224, a first stage system memory management unit 242 for the second master device 226, and a first stage system memory management unit 246 for the third master device 228. In the configuration of FIG. 2, the first stage system memory management unit 240 and the first stage system memory management unit 242 may be coupled to a second stage (S2) system memory management unit (SMMU) 244, and the first stage system memory management unit 246 may be coupled to a second stage system memory management unit 248.

The application processor 202 may have multiple execution environments, such that the application processor 202 may operate in any one of the multiple execution environments at a given time. In other words, the application processor 202 may not be able to operate simultaneously in two or more execution environments. For example, the multiple execution environments may include a non-secure execution environment (also referred to as a non-secure domain) and a trusted execution environment (also referred to as a secure domain or a TrustZone®). In one example, the application processor 202 may run a rich OS (e.g., Windows® or Linux®) on a first virtual machine 204 while operating in a non-secure execution environment and, therefore, may execute non-secure instructions (also referred to as non-secure software or non-secure code). In another example, the application processor 202 may switch to a trusted execution environment (TEE) 210 to execute secure instructions (also referred to as secure software or secure code).

As shown in FIG. 2, the application processor 202 may implement multiple virtual machines. In the aspect of FIG. 2, the application processor 202 may implement the first virtual machine 204 (also referred to as virtual machine 1 (VM1)) and a second virtual machine 206 (also referred to as virtual machine 2 (VM2)). In an aspect, a first rich OS (e.g., Windows®) may run on the first virtual machine 204 and a second rich OS (e.g., Linux®) may run on the second virtual machine 206.

The first master device 224 and the second master device 226 may perform work on behalf of the first rich OS running on the first virtual machine 204. For example, the first master device 224 and/or the second master device 226 may be a graphics processing unit (GPU), a Universal Serial Bus (USB) controller, a direct memory access (DMA) controller, or other appropriate master device. For example, the first slave device 230, the second slave device 232, and/or the third slave device 234 may be a memory device, a memory mapped input/output (I/O) device, or other suitable type of resource.

As shown in FIG. 2, the master devices 224, 226, and 228, and the slave devices 230, 232, and 234 include shading to facilitate identification of the domain (e.g., the virtual machine 1 204 or the virtual machine 2) to which the master devices 224, 226, and 228, and the slave devices 230, 232, and 234 belong to. For example, it should be noted that the master device 3 228 is partly shaded with the same shading as the second virtual machine 206 to indicate that the third master device 228 may be controlled by the second virtual machine 206, in addition to being partly shaded with the same shading as the first virtual machine 204 to indicate that the third master device 228 may also be controlled by the first virtual machine 204. In other words, the third master device 228 may perform an operation or function on behalf of the first virtual machine 204 or the second virtual machine 206. It should also be noted that the first slave device 230, the first master device 224, and the second master device 226 are shaded the same as the first virtual machine 204 to indicate that the first slave device 230, the first master device 224, and the second master device 226 belong to the same domain as the first virtual machine 204. Therefore, the first slave device 230 may be controlled by the first virtual machine 204, the first master device 224, the second master device 226, and/or the third master device 228.

In one example, the first master device 224 may generate a memory transaction 252 intended for the first slave device 230, such as a memory read operation or a memory write operation. The memory transaction 252 may undergo address translation at the first stage (S1) system memory management unit (SMMU) 240 and/or the second stage (S2) system memory management unit (SMMU) 244. A translated memory transaction 256 may then be transferred over the system bus 236, and received (e.g., as the signal 262) by the first slave device 230. In another example, the second master device 226 may generate a memory transaction 254 intended for the second slave device 232, such as a memory read operation or a memory write operation. The memory transaction 254 may undergo address translation at the first stage (S1) system memory management unit (SMMU) 242 and/or the second stage (S2) system memory management unit (SMMU) 244. A translated memory transaction 256 may then be transferred over the system bus 236, and received (e.g., as the signal 264) by the second slave device 232. The protection unit 238 may be configured to allow or deny a transaction (e.g., the signal 264) based on predetermined access permissions, attributes, etc. to ensure that transactions directed to a slave device (e.g., the second slave device 232) including secure resources are authorized.

The third master device 228 may perform work on behalf of a first rich OS running on the first virtual machine 204 or a second rich OS running on the second virtual machine 206. For example, the third master device 228 may be a graphics processing unit (GPU), a Universal Serial Bus (USB) controller, a direct memory access (DMA) controller, or other appropriate master device. For example, the third slave device 234 may be a memory device, a memory mapped input/output (I/O) device, or other suitable type of resource. In the example configuration of FIG. 2, the third slave device 234 may be controlled only by the second virtual machine 206 and/or the third master device 228. In other words, the rich OS running on the first virtual machine 204, the first master device 224, and the second master device 226 may not control the third slave device 234.

In one example, the third master device 228 may generate a transaction 258 intended for the third slave device 234, such as a memory read operation or a memory write operation. The transaction 258 may undergo address translation at the first stage (S1) system memory management unit (SMMU) 246 and/or the second stage (S2) system memory management unit (SMMU) 248. A translated memory transaction 260 may then be transferred over the system bus 236, and received (e.g., as the signal 266) by the third slave device 234. In other examples, the third master device 228 may generate a memory transaction for the first slave device 230 and/or the second slave device 232 in a manner similar to that described above with respect to the third slave device 234.

When the application processor 202 is implementing multiple virtual machines and, therefore, running multiple rich operating systems, the memory that is being allocated by each rich operating system may not be the true physical memory of the system. Instead, the memory that is being allocated by each rich OS may be an intermediate physical memory. Accordingly, each virtual machine may be assigned a unique intermediate physical address (IPA) space that is mapped to a corresponding region of a hardware resource (e.g., the first slave device 230, the second slave device 232, or the third slave device 234) represented by a physical address (PA) space. Furthermore, a virtual machine may allocate its corresponding unique intermediate physical address (IPA) space as a virtual address (VA) space to a process (e.g., application or software) supported by the virtual machine. Therefore, the virtual address space may be considered to be an abstraction of the intermediate physical address space, and the intermediate physical address space may be considered to be an abstraction of the physical address space.

In the virtualized system discussed above, a memory access transaction from a rich OS may undergo a first stage of memory address translation to convert a virtual address in the memory access transaction to an intermediate physical address. The memory access transaction may further undergo a second stage of memory address translation to convert the intermediate physical address to a physical address. For example, the application processor 202 may include a hypervisor device 208 that may control the second stage of address translation by configuring the relationships between the intermediate physical addresses and their corresponding physical addresses. Information to be used for translating an address (e.g., page tables and/or other suitable information) with regard to a particular translation stage (e.g., S1, S2) may be referred to as a context bank (CB).

A system MMU (SMMU) may be an MMU that is configured in a system (e.g., an SoC device) for master devices. As previously described, master devices may perform some operations or functions (e.g., data transfer operations) on behalf of a rich OS. An SMMU may provide a memory view (e.g., a virtualized memory view) of the system to the master devices that is consistent with that of the rich OS. Accordingly, the hypervisor device 208 may provide a "virtualized" view of the memory to each virtual machine through a second stage (S2) of memory translations. Therefore, the memory access transactions from a rich OS and those from the master devices may undergo a first stage (S1) of memory address translation and may further undergo a second stage (S2) of memory address translation. For example, a memory access transaction from a first rich OS running on the first virtual machine 204 may undergo a first stage of address translation at the first stage (S1) memory management unit (MMU) 212. The first stage (S1) memory management unit (MMU) 212 may be managed by the first rich OS running on the first virtual machine 204. In this example, the memory access transaction may further undergo a second stage of address translation at the second stage (S2) memory management unit (MMU) 214. The second stage (S2) memory management unit (MMU) 214 may be managed by the hypervisor device 208. The second stage of memory address translation may enable isolation of the memory regions owned by each virtual machine (e.g., the first virtual machine 204 and/or the second virtual machine 206) and thus may allow virtual machine isolation (also referred to as virtual machine sandboxing). This may be analogous to operating system kernel sandboxing user-processes using first stage address translations. Each SMMU may contain multiple translation contexts (also referred to as context banks) that may be applied to specific streams of memory access transactions.

Figure 3:
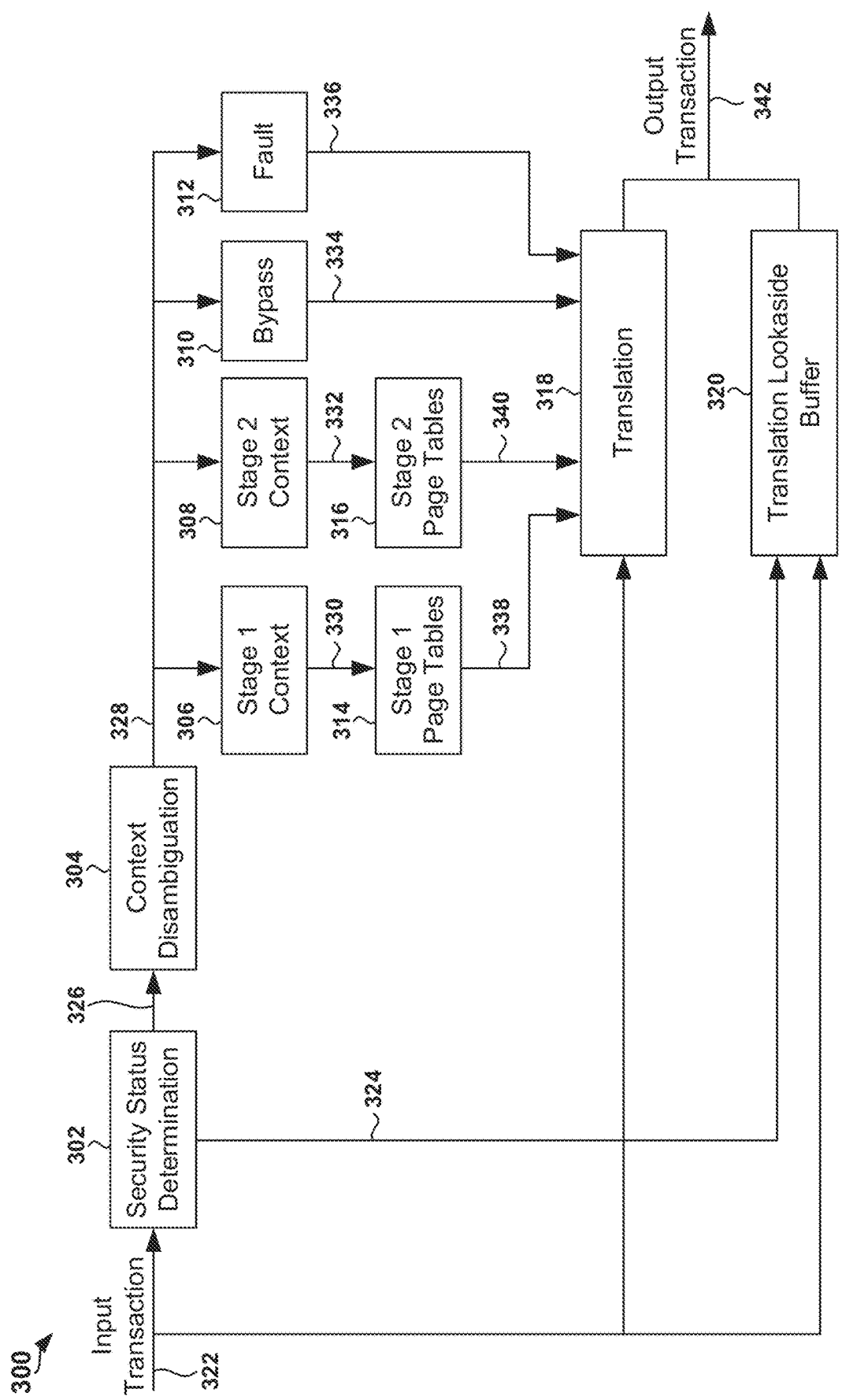
FIG. 3 is a block diagram illustrating a translation process in a system memory management unit (SMMU).

FIG. 3 is a block diagram 300 illustrating a translation process in a system memory management unit (SMMU). FIG. 3 includes a security status determination block 302, a context disambiguation block 304, a stage 1 context block 306, a stage 2 context block 308, a bypass block 310, a fault block 312, stage 1 page tables 314, stage 2 page tables 316, a translation block 318, and a translation lookaside buffer 320.

As shown in FIG. 3, an input transaction 322 (e.g., a memory access transaction) may be received by an SMMU and may be provided to the security status determination block 302. Since an SMMU is architected to support shared use between a secure domain (e.g., a trusted execution environment) and a non-secure domain, the security status determination block 302 may identify the domain to which the transaction 322 belongs. The identified domain may then allow determination of the set of translation contexts that should be used for the subsequent processing of the transaction. The security status determination block 302 may then provide a signal 326 that includes the security status to the context disambiguation block 304.

The context disambiguation block 304 may resolve which translation context the SMMU should apply in processing the input transaction 322. In one example, the context disambiguation block 304 may provide a signal 328 that indicates a context to be applied for translation of the input transaction 322. In one example, the input transaction 322 may be associated with a transaction stream. A transaction stream is a sequence of transactions associated with a particular thread of activity within a system. A thread of activity can be viewed as a type or class of accesses such as an encoding operation, a decoding operation, or other type of operation. All the transactions from the same transaction stream may be associated with the same translation context. Transactions are associated with a transaction stream using a stream identifier (also referred to as a stream ID). A stream ID may be derived from transaction identification information that is conveyed with the transaction by the system interconnect. In other words, the stream ID is an attribute that may be conveyed by a master device along with each read/write transaction.

The first stage context block 306 may retrieve the appropriate first stage context that is to be applied and may transmit a signal 330 that includes the first stage context to the first stage page tables block 314. The first stage page tables block 314 may provide a signal 338 that includes the appropriate page tables to be used in performing address translation to the translation block 318. The second stage context block 308 may retrieve the appropriate second stage context that is to be applied and may transmit a signal 332 that includes the second stage context to the second stage page tables block 316. The second stage page tables block 316 may provide a signal 340 that includes the appropriate page tables to be used in performing address translation to the translation block 318. In some scenarios, the SMMU may be configured to bypass the translation process for a transaction at the bypass block 310 or to fault the transaction regardless of the translation state at the fault block 312. In such scenarios, the bypass block 310 may transmit a bypass signal 334 to the translation block 318, or the fault block 312 may transmit a fault signal 336 to the translation block 318. As shown in FIG. 3, the translation block 318 may receive the input transaction 322 and may perform an address translation operation based on the first stage page tables in the signal 338 and/or the second stage page tables in the signal 340. The translation block 318 may then provide the output transaction 342 resulting from the address translation operation. In some scenarios, the translation lookaside buffer 320 may receive the input transaction 322 and a signal 324 that includes the security status determination. The translation lookaside buffer 320 may determine a previous result of an address translation operation performed on the input transaction 322 and may provide the output transaction 342 resulting from the previous address translation operation.

Figure 4:
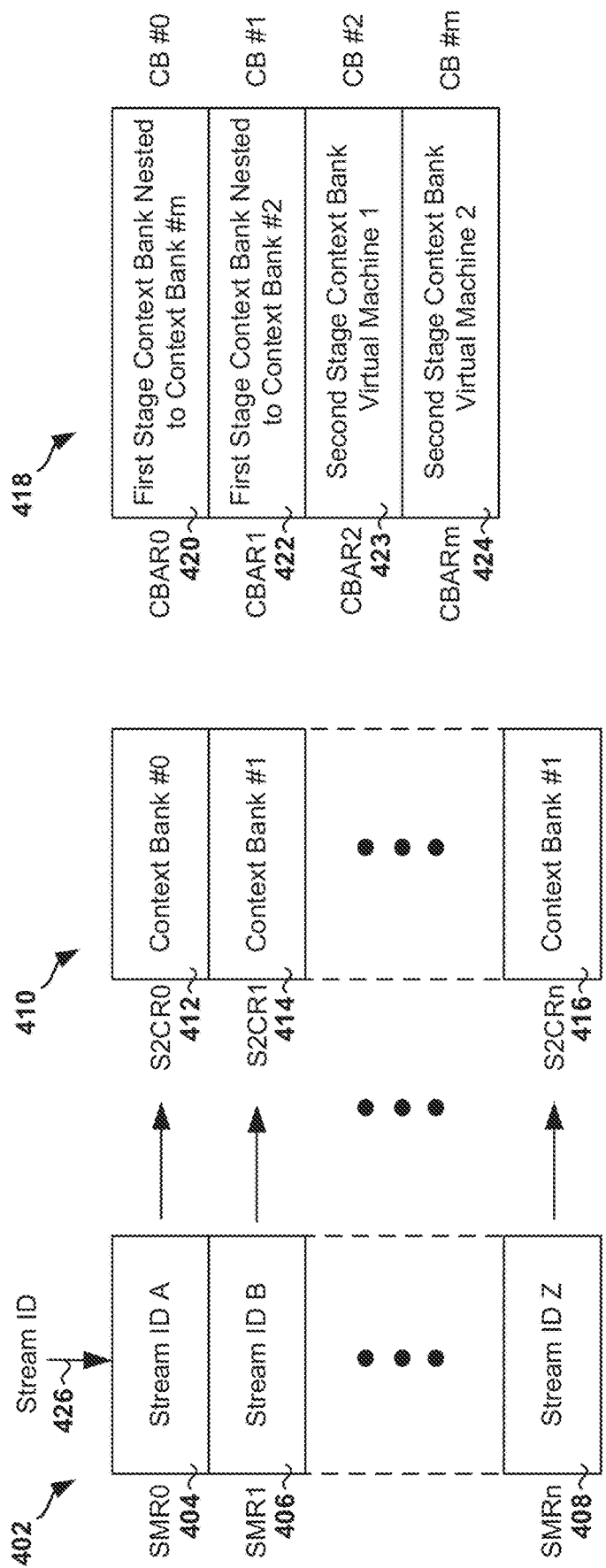
FIG. 4 is a diagram illustrating details of an example context disambiguation operation.

FIG. 4 is a diagram illustrating details of an example context disambiguation operation. Within an SMMU, the mapping of a transaction stream to its corresponding translation context is performed by a stream mapping register table, such as the stream mapping register table 402. As shown in FIG. 4, the stream mapping register table 402 may include a number of stream mapping registers that may contain different stream IDs. For example, the stream mapping register 0 (SMR0) 404 may contain a stream ID A, the stream mapping register 1 (SMR1) 406 may contain a stream ID B, and the stream mapping register n (SMRn) 408 may contain a stream ID Z. Each stream mapping register in the stream mapping register table 402 may correspond to a stream to context register (S2CR) in the stream to context register table 410. An S2CR may specify the initial translation context (also referred to as a context bank) to be used in the translation process. For example, the stream mapping register 0 (SMR0) 404 may correspond to the stream to context register 0 (S2CR0) 412, the stream mapping register 1 (SMR1) 406 may correspond to the stream to context register 1 (S2CR1) 414, and the stream mapping register n (SMRn) 408 may correspond to the stream to context register n (S2CRn) 416. A stream mapping register and its corresponding stream to context register may be collectively referred to as a stream mapping register group. Accordingly, the value of n discussed above with reference to FIG. 4 may be an integer that identifies the stream mapping register group number. As further shown in FIG. 4, a context bank attribute register (CBAR) table 418 may include a number of context bank attribute registers that contain a nest stage translation context or a virtual machine identifier. For example, the context bank attribute register 0 (CBAR0) 420 may include information indicating that the context bank 0 is a first stage context bank that is nested to context bank m, the context bank attribute register 1 (CBAR1) 422 may include information indicating that the context bank 1 is a first stage context bank that is nested to context bank 2, the context bank attribute register 2 (CBAR2) 423 may include a first virtual machine identifier (ID) (e.g., the ID of the first virtual machine 204), and the context bank attribute register m (CBARm) 424 may include a second virtual machine ID (e.g., the ID of the second virtual machine 206).

An example context disambiguation operation will now be described with reference to FIG. 4. A transaction from a master device may include a stream ID 426 that is input to an SMMU with other transaction information, such as the type of operation (e.g., read, write, execute), address, size, and/or other appropriate transaction information. The stream ID 426 may be compared with the stream ID values stored in the stream mapping registers of the stream mapping register table 402. Once a stream ID match is found in the stream mapping register table 402, the index value of the stream mapping register that contains the matching stream ID is used to identify a corresponding stream to context bank register in the stream to context register table 410. For example, the index value may be the number of the SMR register (e.g., the index value of the SMR register SMR0 404 may be "0", the index value of the SMR register SMR1 406 may be "1", and so on). For example, if the stream ID 426 matches the stream ID B in the stream mapping register 1 (SMR1) 406, the SMMU may use the index value "1" to determine the corresponding stream to context register 1 (S2CR1) 414. The initial translation context bank indicated in the stream to context register 1 (S2CR1) 414 (e.g., context bank #1) may be a first stage context bank and may contain the index of a second stage context bank. For example, the second stage context bank may include the virtual machine ID. Once the translation contexts are identified, the SMMU may perform a first stage of address translation (and a second stage of address operation if needed) on the transaction to translate the virtual address included in the input transaction to a physical address.

Context Disambiguation Configuration

The entries in the stream mapping register table 402, the stream to context register table 410, and/or the context bank attribute register table 418 may be programmed by a system memory management unit (SMMU) in any relative order. For example, such programming may include programming the stream mapping registers (e.g., the stream mapping register 0 (SMR0) 404, the stream mapping register 1 (SMR1) 406, etc.) with the stream IDs. The stream to context registers (e.g., stream to context register 0 (S2CR0) 412, stream to context register 1 (S2CR1) 414, etc.) corresponding to the stream mapping registers may be programmed with the initial translation context bank number so that the transactions from the stream ID that is programmed in the stream mapping registers are subject to that context bank. In case of nested translations, the context bank attribute register may be programmed with the context bank number of the second stage context bank that the stream ID translations should be nested to.

Example System MMU Virtualization Operation

When a virtual machine running a rich OS accesses a stream mapping register, a stream to context register, and/or a context bank attribute register to configure the contents of a register, these access are trapped to a hypervisor device (e.g., the hypervisor 208). The hypervisor device may emulate the accesses on behalf of the virtual machine. For example, the hypervisor device may program separate second stage translation context banks, one each for a virtual machine.

In one example, a virtual machine may attempt to program a stream ID for a master device that is acting on behalf of the virtual machine in an empty stream mapping register. The write operation may be trapped to the hypervisor device, and the hypervisor device may perform the write operation on behalf of the virtual machine. The virtual machine may attempt to configure a corresponding stream to context register with the first stage translation context bank that the virtual machine chooses to use. The hypervisor device may trap the access and may perform the write operation with the same value. The virtual machine may attempt to program the context bank attribute register indicating that it is a first stage translation context bank. The hypervisor device may trap the access and may configure the context bank attribute register indicating that it is a first stage context bank nested to the second stage context bank for the virtual machine. The hypervisor device may nest the first stage context bank to the second stage context bank corresponding to the virtual machine that is attempting the programming, regardless of the stream ID and without performing any validations.

System-On-Chip Architecture with Multiple Security Domains

Figure 5:
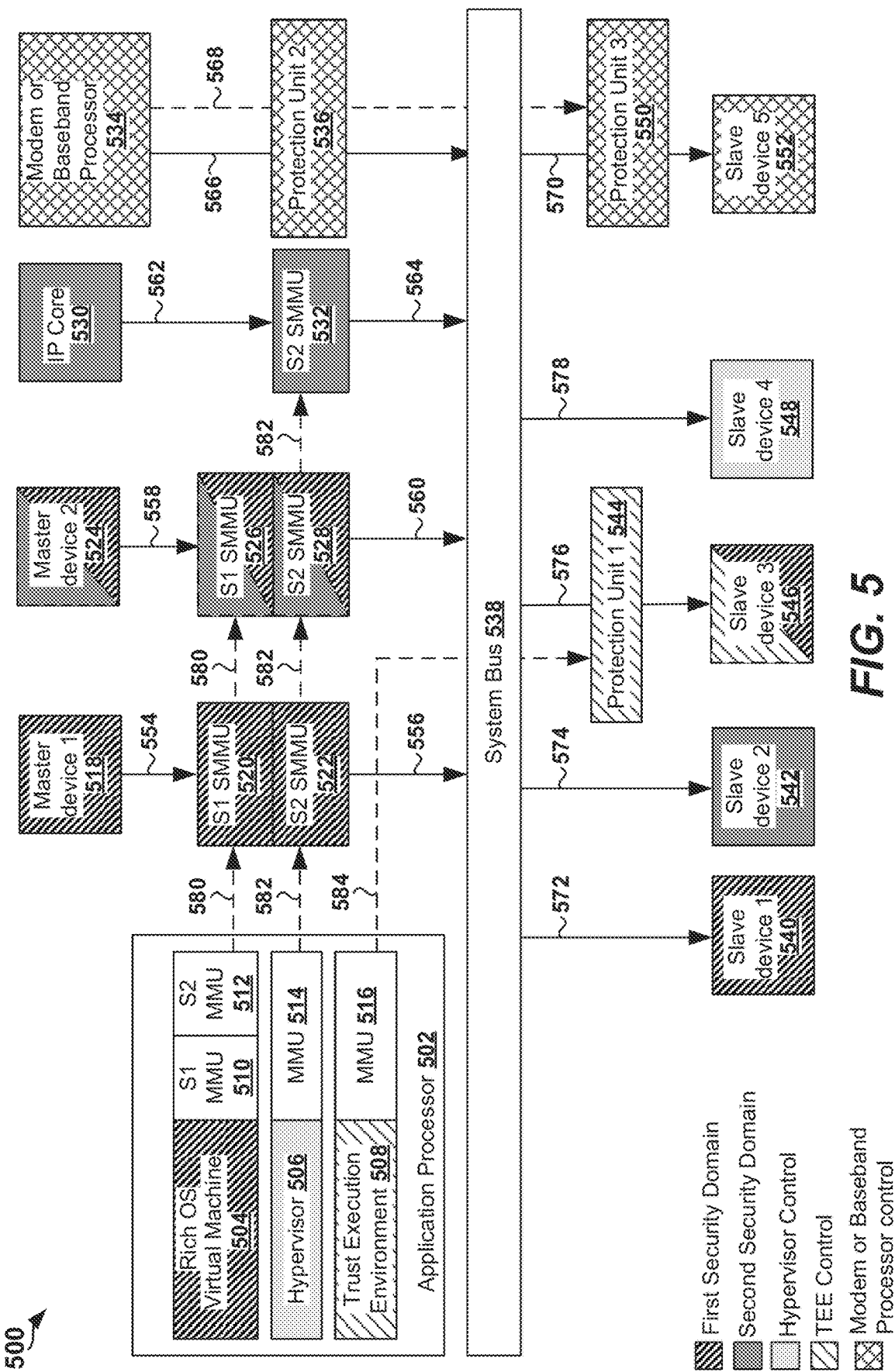
FIG. 5 illustrates a block diagram of an example SoC architecture in accordance with various aspects of the present disclosure.

FIG. 5 illustrates a block diagram of an example system-on-chip (SoC) architecture 500 in accordance with various aspects of the present disclosure. In an aspect, the SoC architecture 500 may be implemented as an integrated circuit in an SoC device. In the aspect of FIG. 5, the SoC architecture 500 is partitioned into multiple security domains. As shown in FIG. 5, the SoC architecture 500 may include an application processor (AP) 502, a first master device (also referred to as a master device 1) 518, a second master device (also referred to as a master device 2) 524, an intellectual property (IP) core 530, a modem or baseband processor 534, a first slave device (also referred to as slave device 1) 540, a second slave device (also referred to as slave device 2) 542, a third slave device (also referred to as slave device 3) 546, a fourth slave device (also referred to as slave device 4) 548, a fifth slave device (also referred to as slave device 5) 552, a system bus 538, a first protection unit (also referred to as protection unit 1) 544, a second protection unit (also referred to as protection unit 2) 536, and a third protection unit (also referred to as protection unit 3) 550. It should be understood that the configuration of FIG. 5 serves as one example implementation and that in other aspects, a different number of slave devices, master devices, and/or system memory management units than those shown in FIG. 5 may be implemented.

The application processor 502, the first master device 518, the second master device 524, the IP core 530, the modem or baseband processor 534, the first slave device 540, the second slave device 542, the third slave device 546, the fourth slave device 548, the fifth slave device 552, the first protection unit 544, the second protection unit 536, and the third protection unit 550 may be coupled to the system bus 538. The SoC architecture 500 may further include a first stage (S1) SMMU 520 for the first master device 518 and a first stage SMMU 526 for the second master device 524. In the aspect of FIG. 5, the first stage SMMU 520 may be coupled to a second stage (S2) SMMU 522, the first stage SMMU 526 may be coupled to a second stage SMMU 528, and the IP core 530 may be coupled to a second stage SMMU 532.

The application processor 502 may have multiple execution environments, such that the application processor 502 may operate in any one of the multiple execution environments at a given time. In other words, the application processor 502 may not be able to operate simultaneously in two or more execution environments. For example, the multiple execution environments may include a non-secure execution environment (also referred to as a non-secure domain) and a trusted execution environment (also referred to as a secure domain or a TrustZone®). In one example, the application processor 502 may run a rich OS (e.g., Windows® or Linux®) on a virtual machine 504 while operating in a non-secure execution environment and, therefore, may execute non-secure instructions (also referred to as non-secure software or non-secure code). In another example, the application processor 502 may switch to a trusted execution environment (TEE) 508 to execute secure instructions (also referred to as secure software or secure code).

The first master device 518 and the second master device 524 may perform work on behalf of the rich OS running on the virtual machine 504. For example, the first master device 518 and/or the second master device 524 may be a graphics processing unit (GPU), a Universal Serial Bus (USB) controller, a direct memory access (DMA) controller, or other appropriate master device. Each of the slave devices 540, 542, 546, 548, 552 in FIG. 5 may be a memory device, a memory mapped input/output (I/O) device, or other suitable type of resource.

As shown in FIG. 5, the first master device 518, the second master device 524, the first slave device 540, and the third slave device 546 include shading to facilitate identification of the security domain (e.g., the first security domain of the virtual machine 504) to which the first master device 518, the second master device 524, the first slave device 540, and the third slave device 546 belong to. Therefore, the first slave device 540 and/or the third slave device 546 may be controlled by the rich OS of the virtual machine 504, the first master device 518, and/or the second master device 524. For example, it should be noted that the second master device 524 is partly shaded with the same shading as the first security domain of the virtual machine 504, in addition to being partly shaded with the same shading as the second security domain to indicate that the second master device 524 may be controlled by both the first security domain (e.g., the first security domain of the virtual machine 504) and the second security domain (e.g., the IP core 530). In other words, the second master device 524 may perform an operation or function on behalf of rich OS of the virtual machine 504 and/or the IP core 530. It should also be noted that the second slave device 542 is shaded the same as the (partial) shading of the second master device 524 and the IP core 530 to indicate that the second slave device 542 belongs to the same security domain (e.g., the second security domain) as the second master device 524 and the IP core 530. Therefore, the second slave device 542 may be controlled by the second master device 524 and the IP core 530. As another example, the hypervisor device 506 may have exclusive control of the fourth slave device 548. As shown in the example configuration of FIG. 5, the third slave device 546 may also be controlled by the TEE 508.

For example, the first master device 518 may generate a memory transaction 554 intended for the first slave device 540, such as a memory read operation or a memory write operation. The memory transaction 554 may undergo address translation at the first stage (S1) SMMU 520 and/or the second stage (S2) SMMU 522. A translated memory transaction 556 may then be transferred over the system bus 538, and received (e.g., as the signal 572) by the first slave device 540. As another example, the second master device 524 may generate a memory transaction 558 intended for the second slave device 542, such as a memory read operation or a memory write operation. The memory transaction 558 may undergo address translation at the first stage (S1) SMMU 526 and/or the second stage (S2) SMMU 528. A translated memory transaction 560 may then be transferred over the system bus 538, and received (e.g., as the signal 574) by the second slave device 542.

For example, the IP core 530 may generate a memory transaction 562 intended for the second slave device 542, such as a memory read operation or a memory write operation. The memory transaction 562 may undergo address translation at the second stage (S2) SMMU 532. A translated memory transaction 564 may then be transferred over the system bus 538, and received (e.g., as the signal 574) by the second slave device 542. As another example, the modem or baseband processor 534 may generate a memory transaction 566 intended for the fifth slave device 552, such as a memory read operation or a memory write operation. The memory transaction 566 may be transferred over the system bus 538, and received (e.g., as the signal 570) by the fifth slave device 552. The first protection unit 544, the second protection unit 536, and/or the third protection unit 550 may be configured to allow or deny a transaction (e.g., the signals 576, 566, 570) based on predetermined access permissions, attributes, etc. to ensure that transactions directed to a slave device including secure resources are authorized.

As shown in FIG. 5, the virtual machine 504 may configure the first stage (S1) SMMU 520 and the first stage (S1) SMMU 526 through the first configuration signal 580, and the hypervisor device 506 may configure the second stage (S2) SMMUs 522, 528, 532 through the second configuration signal 582. In an aspect, the trusted execution environment 508 may configure the first protection unit 544 through the third configuration signal 584, and the modem or baseband processor 534 may configure the second protection unit 536 and/or the third protection unit 550 through the fourth configuration signal 568.

Multiple Security Domains in System-On-Chip (SoC) Device

As previously discussed, an SoC device may be partitioned into multiple security domains. In one example configuration, each security domain may include one or more master devices that perform work on behalf of a particular domain, and may further include a set of slave resources that are accessible to that security domain. For example, a master device may be an application processor, a co-processor, a graphics processing unit (GPU), a Universal Serial Bus (USB) controller, a direct memory access (DMA) controller, or other appropriate master device. For example, a security domain may be a rich OS running on a virtual machine, a media content protection domain, or a video firmware domain.

In an aspect of the present disclosure, partitioning of an SoC device into multiple security domains and maintaining isolation of each security domain may be achieved using second stage address translations managed by a hypervisor device. A security domain may be considered to be a virtual machine with one second stage address translation context per security domain. Except, such virtual machines may only include master devices in the SoC device, and may not have a software component running on the application processor (e.g., the application processor 502). Therefore, there may be no "managing" virtual machine that programs the stream IDs of such master devices into an SMMU. Master devices may generate specific stream IDs while working on behalf of a security domain and, at that time, the stream ID generated by a master device may be considered to fall within that security domain. Therefore, the stream ID may need to be programmed such that the transactions from that stream ID are routed to (or subject to) the second stage address translation context created for that particular security domain.

In one aspect of the disclosure, and as described in detail herein, the memory management features of a rich OS and the SMMU drivers may be used to manage SMMU programming on behalf of different security domains in the SoC device. It should be noted that the rich OS is typically untrusted and that a compromised operating system can attempt to incorrectly program the SMMUs to gain access to protected content. In the present disclosure, the functionality that is already present in a rich OS may be leveraged to program and/or manage stream IDs for different security domains in the SoC device, while maintaining the security of various use-cases (e.g., media protection, co-processor specific IP protection, and/or biometric authentication). Security measures may be implemented to ensure that stream IDs are programmed appropriately so that all the transactions associated with the stream IDs are routed to the correct second stage context bank for that security domain. Therefore, a malicious rich OS may be prevented from attempting to program the stream IDs from different security domains to one first stage context bank. These security measures may maintain the integrity of the security domains defined in the SoC device.

The aspects described herein may enable security validations integrated with system SMMU virtualization to ensure SoC device security when a rich OS is managing stream IDs that correspond not only to the security domain that the rich OS belongs to, but also the stream IDs that are associated with other security domains. Moreover, the aspects described herein provide for the security logic for SMMU virtualization that allows a rich OS to select any context bank as a first stage context bank for any stream ID. A hypervisor device may connect the first stage context bank to the appropriate second stage context bank based on the domain of the stream ID. The security logic may maintain the security of the SoC domains by allowing multiple stream IDs belonging to the same security domain to be attached to the same first stage context bank, but preventing multiple stream IDs from different security domains to attach to the same first stage context bank. This may prevent master devices acting on behalf of one security domain to gain access to the resources of other security domains. In some aspects, a stream ID may fall within different security domains at different times based on active use-cases.

Example Operations

In one example scenario, with reference to FIG. 5, the first master device 518 may be about to perform a memory access transaction on behalf of the rich OS running on the virtual machine 504. The first master device 518 may fall within the security domain of the rich OS (e.g., the first security domain) running on the virtual machine 504. The rich OS running on the virtual machine 504 may program the stream IDs associated with the security domain of the rich OS (e.g., the stream IDs that may be included in transactions generated at the first master device 518) to a first stage context bank. The hypervisor device 506 may trap that memory access transaction and may determine that the first master device 518 is configured to perform operations on behalf of the rich OS. Therefore, the hypervisor device 506 may map the stream IDs corresponding to the first master device 518 to the second stage context bank of that security domain.

With respect to the second master device 524 in FIG. 5, the second master device 524 may be capable of generating different stream IDs that are associated with different security domains. For example, with reference to FIG. 5, the second master device 524 is partly shaded to indicate that the second master device 524 may be controlled by the first security domain and/or the second security domain. In other words, the second master device 524 may perform operations and/or functions on behalf of a first security domain and/or a second security domain. Accordingly, the second master device 524 may be capable of performing operations with respect to multiple security domains at the same time.

In an aspect of the present disclosure, the rich OS running on the virtual machine 504 may be allowed to program all the stream IDs for the second master device 524 (e.g., including stream IDs associated with the rich OS running on the virtual machine 504 and stream IDs associated with other security domains). Therefore, in one example, the rich OS running on the virtual machine 504 may manage first and second stream IDs for the second master device 524, such that the first stream ID is routed to the second stage context bank that belongs to the same domain as the rich OS, and the second stream ID is routed to a second stage context bank of a different security domain.

Example Programming of Address Translation Registers

Examples of the manner in which a rich OS may program address translation registers will now be described. In an SMMU that implements a stream matching approach, there may be three registers of interest: 1) a stream match register (SMR) that performs stream matching 2) a stream to context register (S2CR) that corresponds to the SMR and points to a context bank and 3) a context bank attribute register (CBAR) that includes information about a context bank. The CBAR may include a second stage context bank index in case of a first stage context bank, and a virtual machine ID in case of a second stage context bank. Accesses to these registers are virtualized by a hypervisor device as in the case of standard virtualization. A rich OS may attempt to program these registers in order to associate stream IDs to a context bank. In some aspects, such programming of the three registers may be performed in any order.

When the rich OS attempts to program (e.g., generates a command to write to a register) an SMR register, the security logic (e.g., the hypervisor device) checks to determine if the corresponding stream to context register (S2CR) is pointing to a valid context bank. If it does not point to a context bank, the write operation is performed. If it points to a context bank, the hypervisor device validates that the stream ID being programmed by the rich operating system belongs to the same domain as the other stream IDs attached to that (e.g., stage 1) context bank. This helps to prevent peripherals from other domains gaining access to each other's data as previously described. If validation succeeds, the hypervisor device allows the write operation from the rich OS to be performed on the SMR register.

For example, with reference to FIGS. 4 and 5, when the rich OS running on the virtual machine 504 attempts to program the SMR register SMR0 404 in the stream to mapping table 402, the hypervisor device 506 may check to determine if the corresponding stream to context register S2CR0 412 is pointing to a valid context bank. Since the stream to context register S2CR0 412 is pointing to the context bank #0 (e.g., a valid context bank), the hypervisor device 506 may validate that the stream ID being programmed by the rich OS belongs to the same domain as the other stream IDs attached to the context bank #0. Therefore, in this case, the hypervisor device 506 may allow a stream ID that belongs to the same domain as other stream IDs pointing to context bank #0 to be written in the SMR register SMR0 404.

When the rich OS (e.g., the rich OS running on the virtual machine 504) attempts to program (e.g., write to) a stream to context register (e.g., the stream to context register S2CR0 412) with a stream ID from a different security domain that is pointing to the same first stage context bank, the hypervisor device (e.g., the hypervisor device 506) may determine the stream ID that it is attempting to point to a context bank. If no stream ID is found, the hypervisor device may allow the write operation. Otherwise, the hypervisor device may validate that no other stream to context register with a stream ID from a different domain is pointing to the same first stage context bank. If the hypervisor device determines that another stream ID from a different security domain is pointing to the same first stage context bank, the hypervisor device may abort the write operation for the stream to context register from the rich OS.

When the rich OS (e.g., the rich OS running on the virtual machine 504) attempts to write to a context bank attribute register (e.g., the context bank attribute register CBAR0 420) of a context bank, the hypervisor device (e.g., the hypervisor device 506) may check whether there are any stream to context registers (e.g., the stream to context register S2CR0 412) pointing to this context bank. If none, the hypervisor device allows the write operation, however, the hyper device sets the context bank attribute register to fault since the knowledge of stream IDs that may point to this context bank is unknown. Otherwise, the hypervisor device determines which stream IDs are pointing to the context bank (which should all be from same domain based on above validations) and the first stage context bank is nested to the second stage context bank of the security domain that the stream IDs belong to.

In the aspects described above, the exemplary register descriptions and the sequence of security validations are described with respect to an SMMU (e.g., as implemented in the ARM® architecture). However, it should be understood that the aspects described herein are equally applicable to any other architecture that employs a hypervisor device or a virtual machine manager (VMM).

In other implementations of the aspects described herein, an activity buffer may be used to keep record of all the activities related to virtualization and, at the end, perform all the accesses to hardware at once. In some aspects, all of the previously described validations may be performed in real time per virtualized access to each register as opposed to maintaining the activity buffer. Therefore, the need for such a buffer, which may become arbitrarily large, may be avoided. Accordingly, the aspects described herein may allow for secure SMMU virtualization without requiring the addition of substantial hardware elements.

Therefore, the present disclosure allows a non-secure rich OS to manage stream IDs associated with different security domains and, therefore, removes the need for a hypervisor device to support multiple virtual machines. As such, hypervisor device designs with reduced complexity and increased security may be achieved. Accordingly, the aspects described herein may maintain data integrity in applications involving sensitive data, such as media content protection and biometrics.

Example Security Logic Operations in a Hypervisor Device

Figure 6:
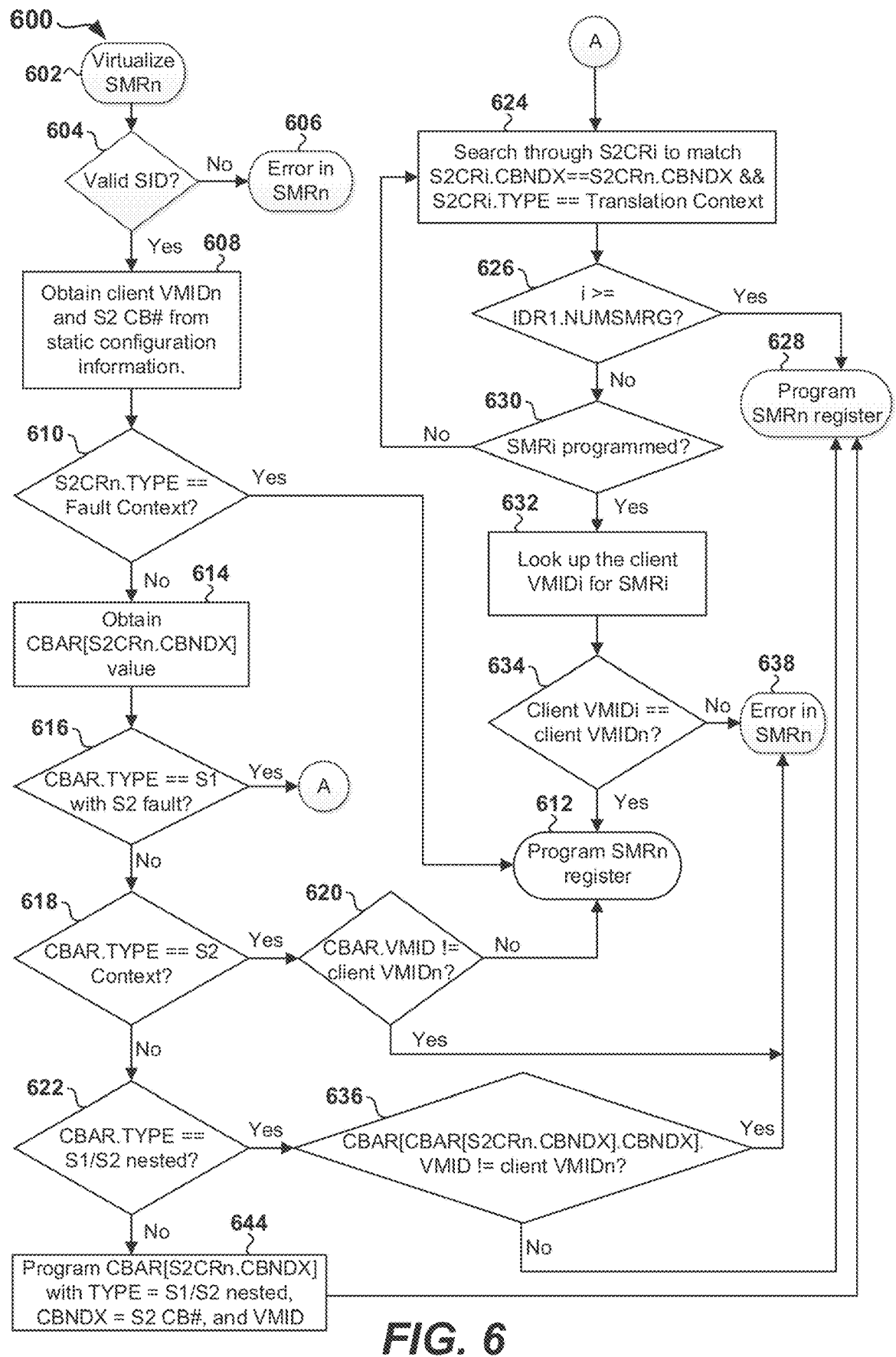
FIG. 6 is a flow chart of a method for a hypervisor device.

FIG. 6 is a flow chart 600 of a method for a hypervisor device. For example, the method of FIG. 6 may be implemented by a hypervisor device (e.g., the hypervisor device 506) for programming a stream match register (SMR).

As shown in FIG. 6, the hypervisor device may virtualize a stream mapping register n (SMRn) 602. The hypervisor device may determine if the SMRn includes a valid stream ID (SID) 604. For example, such valid stream ID may be a stream ID that the hypervisor device recognizes based on the static configuration information of stream IDs and the corresponding security domain they belong to. If the SMRn does not include a valid stream ID 604, the hypervisor device may determine an error in the SMRn 606. Otherwise, if the SMRn includes a valid stream ID, the hypervisor device may obtain a client virtual machine ID n (VMIDn) and a second stage context bank number (S2 CB#) from static configuration information for the corresponding stream ID 608. The hypervisor device may determine whether the stream to context register n type (S2CRn.TYPE) is equal to a fault context 610. For example, the stream to context register n type may be equal to a fault context when the stream ID does not point to any valid context bank. In an aspect, validations may be performed at the time the stream to context register n will be programmed. If the stream to context register n type (S2CRn.TYPE) is equal to a fault context 610, this may indicate that the S2CRn is not programmed and the hypervisor device may program the SMRn register 612. Otherwise, the hypervisor device may obtain the CBAR[S2CRn.CBNDX] value 614. For example, the CBAR[S2CRn.CBNDX] value may be the CBAR register value based on the context bank index value (CBNDX) programmed in the S2CRn register corresponding to the SMRn. The hypervisor device may determine whether the TYPE field associated with the CBAR indicates a first stage context bank and that there is a fault associated with the second stage context bank 616. In other words, the hypervisor device may determine whether the context bank is programmed as a first stage context bank with a second stage context bank fault. If the TYPE field associated with the CBAR does not indicate a first stage context bank and that there is a fault associated with the second stage context bank 616, the hypervisor device may determine whether the TYPE field associated with the CBAR indicates a second stage context bank 618. For example, the hypervisor device may determine whether the context bank obtained in operation 614 is programmed as a second stage context bank. If the TYPE field associated with the CBAR indicates a second stage context bank 618, the hypervisor device may determine whether the virtual machine ID of the CBAR is not equal to the client virtual machine ID n 620. For example, if the context bank obtained in operation 614 is identified as only a second stage context bank in operation 618, the hypervisor device may determine whether the context bank obtained in operation 614 is designated for the same VMID (e.g., the same security domain or the same virtual machine) as that of the domain of the stream ID being programmed 40. Therefore, if the context bank obtained in operation 614 is designated for the same VMID (e.g., the same security domain or the same virtual machine) as that of the domain of the stream ID being programmed, the hypervisor device may program the SMRn 612. Otherwise, the hypervisor device may determine an error in the SMRn 638.

If the TYPE field associated with the CBAR does not indicate a second stage context 618, the hypervisor device determines whether the TYPE field of the CBAR indicates whether the context bank obtained in operation 614 is programmed as a first stage (S1) context bank nested to a second stage (S2) context bank 622. If the first stage context bank is nested to a second stage context bank 622, the hypervisor device may determine whether CBAR[CBAR [S2CRn.CBNDX].CBNDX].VMID is not equal to the client virtual machine ID n 636. For example, CBAR[CBAR [S2CRn.CBNDX].CBNDX].VMID may represent the VMID of the nested second stage context bank. If the hypervisor device determines at operation 636 that the VMID of the nested second stage context bank is the same as that of the VMID of the stream ID being programmed, then the hypervisor device may program the SMRn 628. Otherwise, the hypervisor device may determine an error in the SMRn 638.

If the first stage context bank is not nested to a second stage context bank 622 (e.g., a first stage context bank with a bypass of a second stage context bank), then the hypervisor device may program 644 the CBAR register CBAR [S2CRn.CBNDX] with a TYPE field indicating that the first stage context bank is nested to a second stage context bank, with the CBNDX set to the second stage context bank number, and with a VMID 642. It should be noted that at operation 644, since the hypervisor device knows the stream ID being programmed, the hypervisor device may determine the VMID and the corresponding second stage context bank to program the CBAR register as a first stage context bank nested to a second stage context bank that is assigned for the VMID of the stream ID.

If the TYPE field associated with the CBAR indicates a first stage context and that there is a fault associated with the second stage context 616, the hypervisor device may search 624 through all S2CRs (represented as S2CRi in FIG. 6) to determine if there is any other S2CR pointing to (or programmed with) the same context bank as that of the context bank obtained at operation 614. In an aspect, and as shown in FIG. 6, the hypervisor may make such determination at operation 624 when the conditions "S2CRi.CBNDX==S2CRn.CBNDX" and "S2CRi.TYPE==Translation Context" are met. The hypervisor device may determine whether a match is found in any of the total number of stream match registers (represented as IDR1.NUMSMRG) 626. For example, the hypervisor device may determine that the index i is greater than or equal to the total number of stream match registers 626 and that no match has been found in the total number of stream match registers. In this case, the hypervisor device may program the SMRn 628. Otherwise, the hypervisor device may determine whether the matching SMRi is programmed 630. For example, the hypervisor device may determine whether any stream ID programmed in the stream match registers points to the same context bank. If the SMRi is not programmed 630, the hypervisor device may repeat operation 624. If the SMRi is programmed 630, the hypervisor device may look up the client virtual machine ID i for SMRi 632. For example, the hypervisor may determine the virtual machine ID (e.g., client virtual machine ID i) associated with the stream ID programmed at stream match register (SMRi). The hypervisor device may then determine whether the client virtual machine ID i is equal to the client virtual machine ID n 634. In other words, the operation 634 determines whether the stream ID at the stream match register i pointing to the same context bank belongs to the same security domain (e.g., virtual machine ID) as that of the stream ID being programmed in SMRn. If the client virtual machine ID i is not equal to the client virtual machine ID n, then the hypervisor device may determine an error in SMRn 638. Otherwise, the hypervisor device may program the SMRn 612 since the stream ID at the stream match register i belongs to the same security domain as that of the stream ID being programmed in the stream match register n.

Figure 7A:
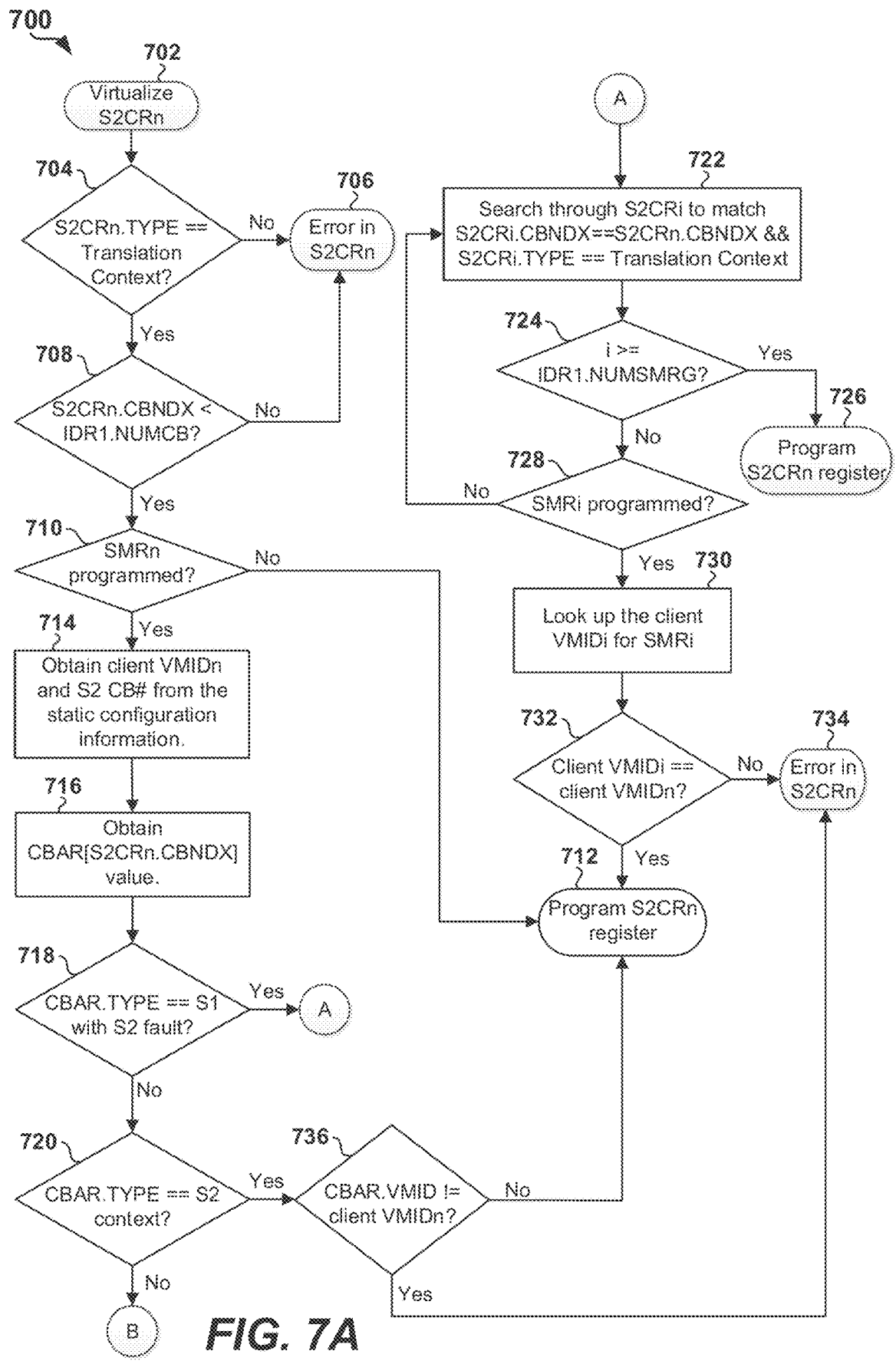
FIG. 7 (including FIG. 7A and FIG. 7B) is a flow chart of a method for a hypervisor device.
Figure 7B:
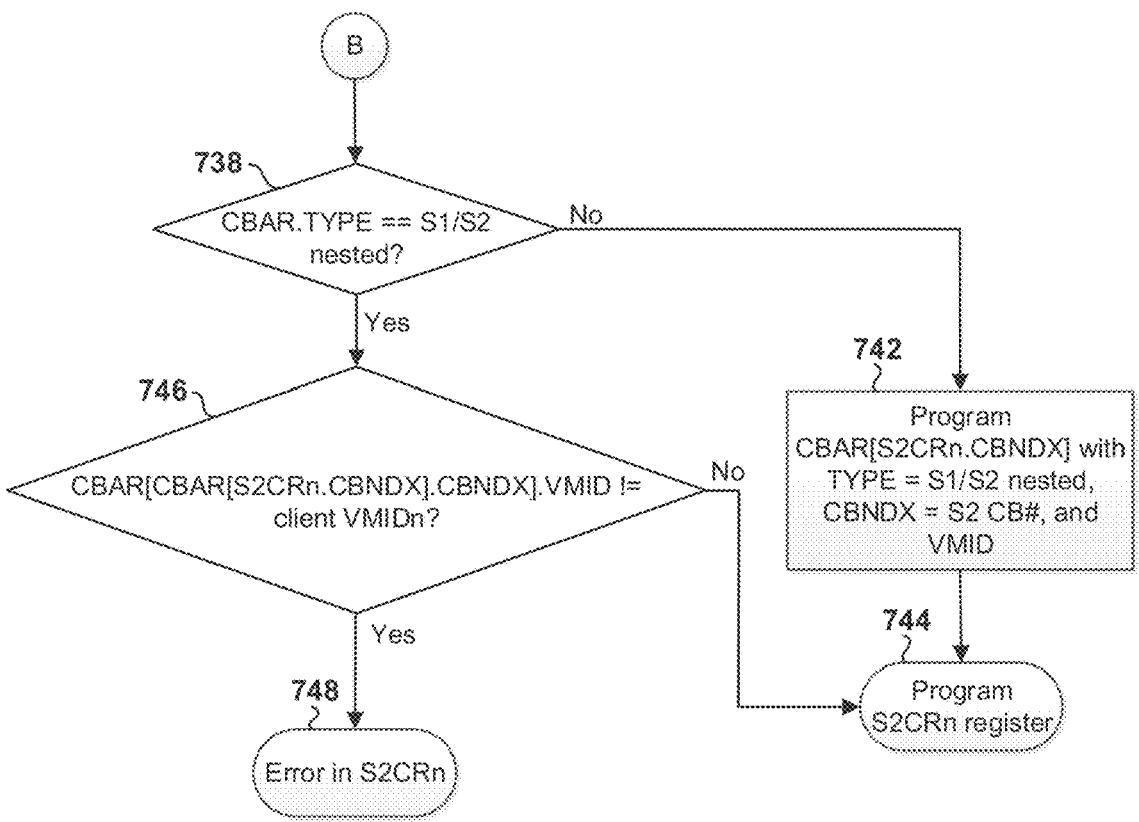

FIG. 7 (including FIG. 7A and FIG. 7B) is a flow chart 700 of a method for a hypervisor device. For example, the method of FIG. 7 may be implemented by a hypervisor device (e.g., the hypervisor device 506) for programming a stream to context register (S2CR).

As shown in FIG. 7A, the hypervisor device may virtualize a stream mapping register n (SMRn) 702. The hypervisor device may determine whether the TYPE field of the S2CRn is equal to a translation context 704. For example, the TYPE field of the S2CRn may not be equal to a translation context at operation 704 if there is an attempt to program the S2CRn as a bypass. If the TYPE field of the S2CRn is not equal to a translation context 704, the hypervisor device may determine an error in the S2CRn 706. This scenario may prevent a rich OS from programming a stream ID as a bypass for security reasons. For example, if a stream ID is programmed as a bypass, then the hypervisor may skip the access control checks imposed in the second stage context bank and, therefore, compromise the security of the system. If the TYPE field of the S2CRn is equal to a translation context 704, the hypervisor device may determine whether the S2CRn.CBNDX is less than IDR1.NUMCB (e.g., the number of context banks present in the hardware) 708. Alternatively stated, the hypervisor at operation 708 determines whether the S2CRn attempted to be programmed points to a valid context bank index, where the valid context bank index is within the number of context banks present in the hardware.

If the S2CRn.CBNDX is less than IDR1.NUMCB 708, the hypervisor device may determine whether the SMRn is programmed 710. For example, at operation 710, the hypervisor may determine whether the SMRn corresponding to the S2CRn is already programmed. If not, the hypervisor device may program the S2CRn 712. In an aspect, if the SMRn is not programmed, the validations may be performed at the time SMRn is programmed with a stream ID. Otherwise, if the SMRn is already programmed 710 (e.g., if the SMRn already includes a valid stream ID), the hypervisor device may obtain a client virtual machine ID n (VMIDn) and a second stage context bank number (S2 CB#) from static configuration information for the corresponding stream ID 714. The hypervisor device may obtain the CBAR[S2CRn.CBNDX] value 716. For example, the CBAR[S2CRn.CBNDX] value may be the CBAR register value based on the context bank index value (CBNDX) programmed in the S2CRn register corresponding to the SMRn. The hypervisor device may determine whether the TYPE field associated with the CBAR indicates a first stage context bank and that there is a fault associated with the second stage context bank 718. In other words, the hypervisor device may determine whether the context bank is programmed as a first stage context bank with a second stage context bank fault. If the TYPE field associated with the CBAR does not indicate a first stage context bank and that there is a fault associated with the second stage context bank 718, the hypervisor device may determine whether the TYPE field associated with the CBAR indicates a second stage context bank 720. For example, the hypervisor device may determine whether the context bank obtained in operation 716 is programmed as a second stage context bank. If the TYPE field associated with the CBAR indicates a second stage context bank 720, the hypervisor device may determine whether the virtual machine ID of the CBAR is not equal to the client virtual machine ID n 736. For example, if the context bank obtained in operation 716 is identified as only a second stage context bank at operation 720, the hypervisor device may determine whether the context bank obtained in operation 716 is designated for the same VMID (e.g., the same security domain or the same virtual machine) as that of the domain of the stream ID being programmed Therefore, if the context bank obtained in operation 716 is designated for the same VMID (e.g., the same security domain or the same virtual machine) as that of the domain of the stream ID being programmed, the hypervisor device may program the S2CRn 712. Otherwise, if the virtual machine ID of the CBAR is not equal to the client virtual machine ID n 736, then the hypervisor device may determine an error in S2CRn 734.

If the TYPE field associated with the CBAR indicates a first stage context and that there is a fault associated with the second stage context 718, the hypervisor device may search 722 through all S2CRs (represented as S2CRi in FIG. 7A) to determine if there is any other S2CR pointing to (or programmed with) the same context bank as that of the context bank obtained in operation 716. In an aspect, and as shown in FIG. 7A, the hypervisor may make such determination at operation 722 when the conditions "S2CRi.CBNDX=S2CRn.CBNDX" and "S2CRi.TYPE=Translation Context" are met. The hypervisor device may determine whether a match is found in any of the total number of stream match registers (represented as IDR1.NUMSMRG) 724. For example, the hypervisor device may determine that the index i is greater than or equal to the total number of stream match registers 724 and that no match has been found in the total number of stream match registers. In this case, the hypervisor device may program the S2CRn 726. Otherwise, the hypervisor device may determine whether the matching SMRi is programmed 728. For example, the hypervisor device may determine whether any stream ID programmed in the stream match registers points to the same context bank. If the SMRi is not programmed 728, the hypervisor device may repeat operation 722. If the SMRi is programmed 728, the hypervisor device may look up the client virtual machine ID i for SMRi 730. For example, the hypervisor may determine the virtual machine ID (e.g., client virtual machine ID i) associated with the stream ID programmed at stream match register (SMRi). The hypervisor device may then determine whether the client virtual machine ID i is equal to the client virtual machine ID n 732. In other words, the hypervisor device at the operation 732 determines whether the stream ID at the stream match register i pointing to the same context bank belongs to the same security domain (e.g., virtual machine ID) as that of the stream ID being programmed in SMRn. If the client virtual machine ID i is not equal to the client virtual machine ID n, then the hypervisor device may determine an error in S2CRn 734. Otherwise, the hypervisor device may program the S2CRn 712 since the stream ID at the stream match register i belongs to the same security domain as that of the stream ID being programmed in the stream match register n.

If the TYPE field associated with the CBAR does not indicate a second stage context 720, then with reference to FIG. 7B, the hypervisor device may determine whether the TYPE field of the CBAR indicates whether the context bank obtained in operation 716 is programmed as a first stage (S1) context bank nested to a second stage (S2) context bank 738. If the first stage context bank is nested to a second stage context bank 738, the hypervisor device may obtain the second stage context bank (e.g., represented as the expression "CBAR[S2CRn.CBNDX].CBNDX" in FIG. 7B) that the S2CRn is pointing to and may obtain the virtual machine ID (e.g., represented as the expression "CBAR [CBAR [S2CRn.CBNDX].CBNDX]. VMID" in FIG. 7B) of this second stage context bank. The hypervisor device may determine whether CBAR[CBAR[S2CRn.CBNDX].CBNDX].VMID is not equal to the client virtual machine ID n (e.g., the virtual machine ID corresponding to the stream ID programmed in SMRn that was obtained in operations 710, 714) 746. If the hypervisor determines at operation 746 that the virtual machine ID of the nested second stage context bank is the same as that of the virtual machine ID of the stream ID being programmed, then the hypervisor device may program the S2CRn 744. Otherwise, the hypervisor device may determine an error in the S2CRn 748.

If the first stage context is not nested to a second stage context 738 (e.g., a first stage context with a bypass of the second stage context), then the hypervisor device may program 742 the CBAR register CBAR[S2CRn.CBNDX] with a TYPE field indicating that the first stage context bank is nested to a second stage context bank, with the CBNDX set to the second stage context bank number, and with a VMID 742. It should be noted that at operation 742, since the hypervisor device knows the stream ID being programmed, the hypervisor device may determine the VMID and the corresponding second stage context bank to program the CBAR register as a first stage context bank nested to a second stage context bank that is assigned for the VMID of the stream ID.

Figure 8:
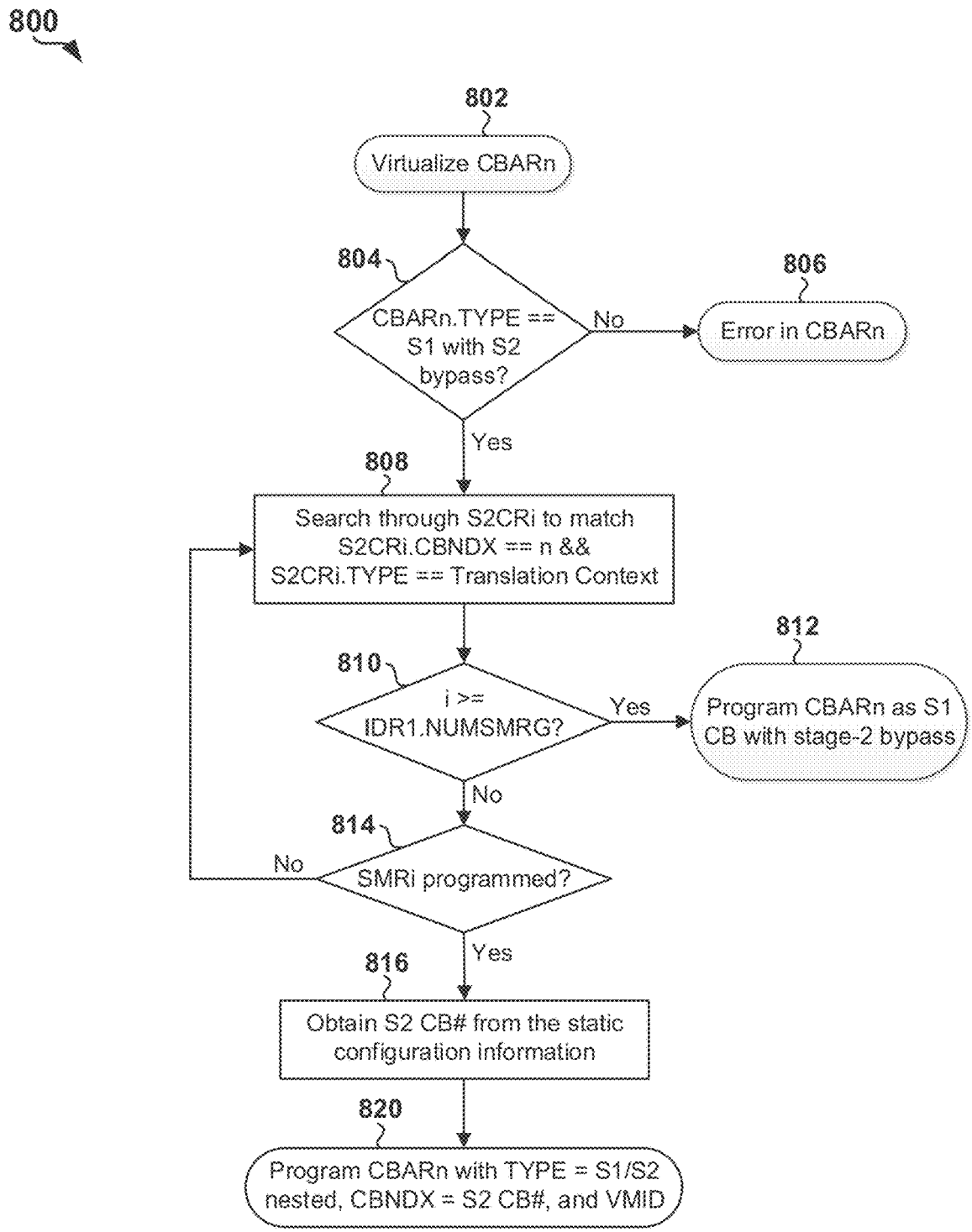
FIG. 8 is a flow chart of a method for a hypervisor device.

FIG. 8 is a flow chart 800 of a method for a hypervisor device. As shown in FIG. 8, the hypervisor device may virtualize a context bank attribute register n (CBARn) 802. The hypervisor device may determine whether the TYPE field of the CBARn indicates a first stage context and a bypass of a second stage context 804. If the TYPE field of the CBARn does not indicate a first stage context and a bypass of a second stage context 804, the hypervisor device may determine an error in the CBARn 806. Otherwise, if the TYPE field of the CBARn indicates a first stage context and a bypass of a second stage context 804, it is expected that the rich OS will attempt to program the CBARn to indicate a first stage context bank with a bypass of the second stage context bank. This scenario is allowed so that the first stage context bank number n (CB #n) corresponding to the CBARn being programmed may be nested to the second stage context bank by the hypervisor device. Therefore, when the TYPE field of the CBARn indicates a first stage context bank and a bypass of a second stage context bank 804, the hypervisor device may search through all S2CRs (represented as S2CRi in FIG. 8) to determine if there is any other S2CR pointing to the CBARn being programmed 808. In an aspect, and as shown in FIG. 8, the hypervisor device may make such determination at operation 808 when the conditions "S2CRi.CBNDX==n" and "S2CRi.TYPE==Translation Context" are met.

The hypervisor device may determine whether a match is found in any of the total number of stream match registers (represented as IDR1.NUMSMRG) 810. For example, the hypervisor device may determine that the index i is greater than or equal to the total number of stream match registers 810 and that no match has been found in the total number of stream match registers. In this case, the hypervisor device may confirm that no stream ID is yet pointing to the CBARn and may program the CBARn as a first stage context bank with a bypass of the second stage context bank 812. For example, since the stream ID is unknown, the virtual machine ID is unknown and the hypervisor device does not know which second stage context bank this first stage context bank should be nested to. Therefore, the hypervisor device may program the CBARn as a first stage context bank and a bypass for the second stage context. It should be noted that the CBARn will be programmed correctly when the stream ID is known (e.g., either in operation 742 in FIG. 7B or operation 644 in FIG. 6).

If there is any S2CR found that is pointing to the context bank corresponding to the CBARn register being programmed, the hypervisor device may determine whether there are any stream IDs programmed in the SMRi corresponding to that S2CR 814. If not, the hypervisor device proceeds to operation 808 and continues to search through the S2CRs for a match. Otherwise, if the hypervisor device finds a stream ID in the SMRi that is programmed to point to the context bank corresponding to the CBARn that is being programmed, then the hypervisor device may obtain the virtual machine ID of the stream ID from the static configuration data. The hypervisor device may then program 820 the CBARn with a TYPE field indicating that the first stage context bank is nested to a second stage context bank, with the CBNDX set to the second stage context bank number, and with a virtual machine ID 820.

Exemplary Device and Method

Figure 9:
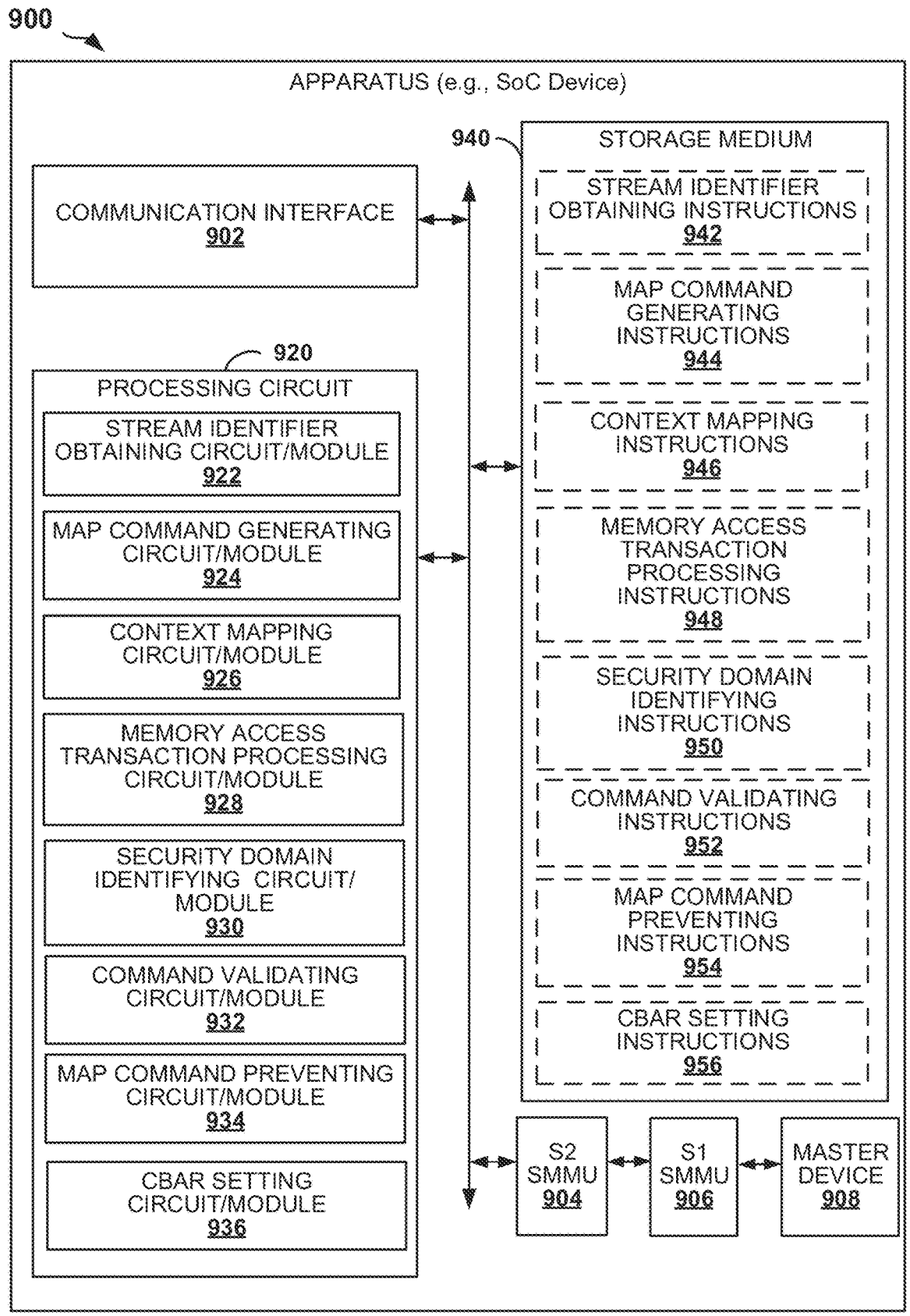
FIG. 9 is block diagram illustrating select components of an apparatus according to at least one example of the disclosure.

FIG. 9 is block diagram illustrating select components of an apparatus 900 in accordance with various aspects of the disclosure. In some aspects, the apparatus 900 may be an integrated circuit. For example, such integrated circuit may be included in a system-on-chip (SoC) device. In other aspects, the apparatus 900 may be an electronic device (e.g., a mobile device, such as a smartphone, laptop computer, etc.). The apparatus 900 includes a communication interface 902, a storage medium 940, a first stage (S1) SMMU 906, a second stage (S2) SMMU 904, a master device 908, and a processing circuit 920. The processing circuit 920 is coupled to or placed in electrical communication with each of the communication interface 902, the storage medium 940, the first stage (S1) SMMU 906, the second stage (S2) SMMU 904, and the master device 908. The communication interface 902 may include, for example, one or more of: signal driver circuits, signal receiver circuits, amplifiers, signal filters, signal buffers, or other circuitry used to interface with a signaling bus or other types of signaling media.

The processing circuit 920 is arranged to obtain, process and/or send data, control data access and storage, issue commands, and control other desired operations. The processing circuit 920 may include circuitry adapted to implement desired programming provided by appropriate media in at least one example. In some instances, the processing circuit 920 may include circuitry adapted to perform a desired function, with or without implementing programming. By way of example, the processing circuit 920 may be implemented as one or more processors, one or more controllers, and/or other structure configured to execute executable programming and/or perform a desired function. Examples of the processing circuit 920 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 920 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 920 are for illustration and other suitable configurations within the scope of the disclosure are also contemplated.

The processing circuit 920 is adapted for processing, including the execution of programming, which may be stored on the storage medium 940. As used herein, the terms "programming" or "instructions" shall be construed broadly to include without limitation instruction sets, instructions, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

In some instances, the processing circuit 920 may include one or more of: a stream identifier obtaining circuit/module 922, a map command generating circuit/module 924, a context mapping circuit/module 926, a memory access transaction processing circuit/module 928, a security domain identifying circuit/module 930, a command validating circuit/module 932, a map command preventing circuit/module 934, and a CBAR setting circuit/module 936.

The stream identifier obtaining circuit/module 922 may include circuitry and/or instructions (e.g., stream identifier obtaining instructions 942 stored on the storage medium 940) adapted to obtain, at a virtual machine of the first security domain, a stream identifier associated with the second security domain.

The map command generating circuit/module 924 may include circuitry and/or instructions (e.g., map command generating instructions 944 stored on the storage medium 940) adapted to generate, at the virtual machine of the first security domain, a command to map the stream identifier associated with the second security domain to a first address translation context.

The context mapping circuit/module 926 may include circuitry and/or instructions (e.g., context mapping instructions 946 stored on the storage medium 940) adapted to map, at a hypervisor device, the first address translation context to a second address translation context that is associated with the second security domain of the stream identifier.

The memory access transaction processing circuit/module 928 may include circuitry and/or instructions (e.g., memory access transaction processing instructions 948 stored on the storage medium 940) adapted to process a stream of memory access transactions that includes the stream identifier based on at least the first address translation context or the second address translation context.

The security domain identifying circuit/module 930 may include circuitry and/or instructions (e.g., security domain identifying instructions 950 stored on the storage medium 940) adapted to identify, at the hypervisor device, a security domain of at least a second stream identifier already mapped to the first address translation context.

The command validating circuit/module 932 may include circuitry and/or instructions (e.g., command validating instructions 952 stored on the storage medium 940) adapted to validate, at the hypervisor device, the generated command when the security domain of at least the second stream identifier is the same as the second security domain and/or validate, at the hypervisor device, the generated command to map the stream identifier when the generated command to map the stream identifier is a write instruction to modify an empty stream to context register.

The map command preventing circuit/module 934 may include circuitry and/or instructions (e.g., map command preventing instructions 954 stored on the storage medium 940) adapted to prevent, at the hypervisor device, the virtual machine from mapping a second stream identifier associated with a third security domain to the first address translation context when the third security domain is different from the second security domain The CBAR setting circuit/module 936 may include circuitry and/or instructions (e.g., CBAR setting instructions 956 stored on the storage medium 940) adapted to set, at the hypervisor device, a context bank attribute register to a fault value when a stream to context register corresponding to the context bank attribute register is empty.

The storage medium 940 may represent one or more processor-readable devices for storing programming, electronic data, databases, or other digital information. The storage medium 940 may also be used for storing data that is manipulated by the processing circuit 920 when executing programming. The storage medium 940 may be any available media that can be accessed by the processing circuit 920, including portable or fixed storage devices, optical storage devices, and various other mediums capable of storing, containing and/or carrying programming By way of example and not limitation, the storage medium 940 may include a processor-readable storage medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other mediums for storing programming, as well as any combination thereof. Thus, in some implementations, the storage medium may be a non-transitory (e.g., tangible) storage medium.

The storage medium 940 may be coupled to the processing circuit 920 such that the processing circuit 920 can read information from, and write information to, the storage medium 940. That is, the storage medium 940 can be coupled to the processing circuit 920 so that the storage medium 940 is at least accessible by the processing circuit 920, including examples where the storage medium 940 is integral to the processing circuit 920 and/or examples where the storage medium 940 is separate from the processing circuit 920.

Programming/instructions stored by the storage medium 940, when executed by the processing circuit 920, causes the processing circuit 920 to perform one or more of the various functions and/or process steps described herein. For example, the storage medium 940 may include one or more of: stream identifier obtaining instructions 942, map command generating instructions 944, context mapping instructions 946, memory access transaction processing instructions 948, security domain identifying instructions 950, command validating instructions 952, map command preventing instructions 954, and CBAR setting instructions 956. Thus, according to one or more aspects of the disclosure, the processing circuit 920 is adapted to perform (in conjunction with the storage medium 940) any or all of the processes, functions, steps and/or routines for any or all of the apparatuses described herein. As used herein, the term "adapted" in relation to the processing circuit 920 may refer to the processing circuit 920 being one or more of configured, employed, implemented, and/or programmed (in conjunction with the storage medium 940) to perform a particular process, function, step and/or routine according to various features described herein. The master device 908 may represent a memory device or any other suitable resource as described herein.

With the above in mind, examples of operations according to the disclosed aspects will be described in more detail in conjunction with the flowchart of FIG. 10 (including FIG. 10A and FIG. 10B). For convenience, the operations of FIG. 10 (or any other operations discussed or taught herein) may be described as being performed by specific components. It should be appreciated, however, that in various implementations these operations may be performed by other types of components and may be performed using a different number of components. It also should be appreciated that one or more of the operations described herein may not be employed in a given implementation.

Figure 10A:
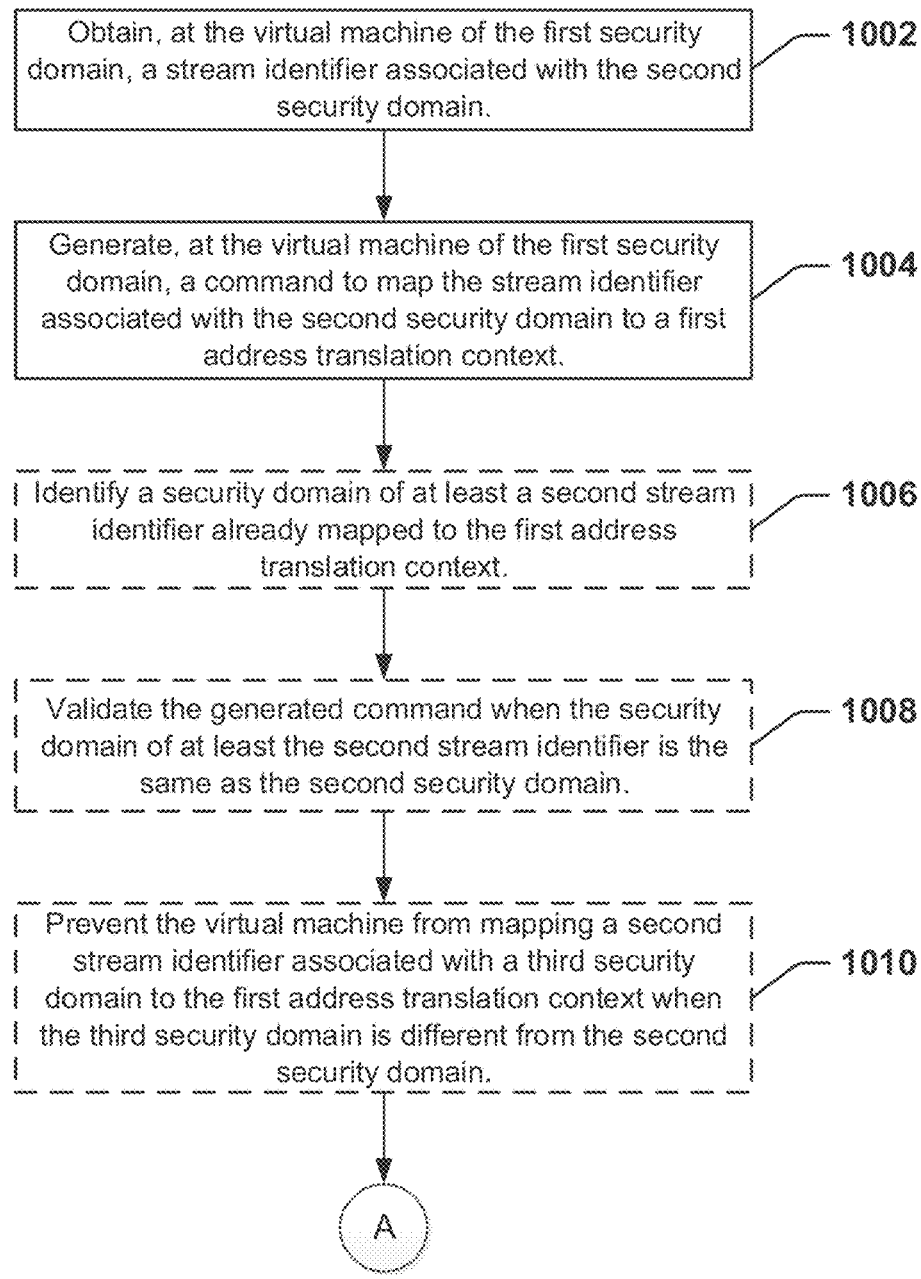
FIG. 10 (including FIG. 10A and FIG. 10B) is a flowchart illustrating a method in accordance with various aspects of the present disclosure.
Figure 10B:
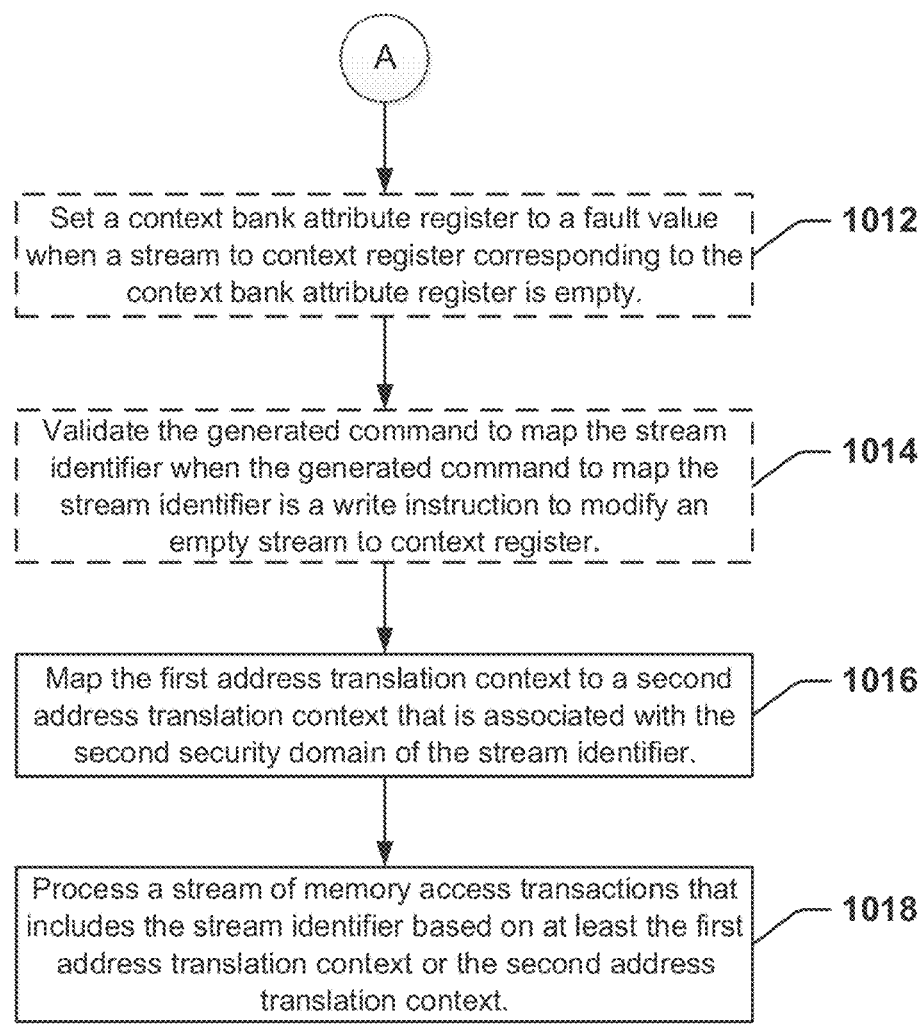

FIG. 10 (including FIG. 10A and FIG. 10B) is a flowchart 1000 illustrating a method for an apparatus. It should be understood that the operations in FIG. 10 represented with dashed lines represent optional operations.

The apparatus obtains, at a virtual machine of the first security domain, a stream identifier associated with the second security domain 1002. The apparatus generates, at the virtual machine of the first security domain, a command to map the stream identifier associated with the second security domain to a first address translation context 1004. The apparatus identifies, at the hypervisor device, a security domain of at least a second stream identifier already mapped to the first address translation context 1006. The apparatus validates, at the hypervisor device, the generated command when the security domain of at least the second stream identifier is the same as the second security domain 1008. The apparatus prevents, at the hypervisor device, the virtual machine from mapping a second stream identifier associated with a third security domain to the first address translation context when the third security domain is different from the second security domain 1010. The apparatus sets, at the hypervisor device, a context bank attribute register to a fault value when a stream to context register corresponding to the context bank attribute register is empty 1012. The apparatus validates, at the hypervisor device, the generated command to map the stream identifier when the generated command to map the stream identifier is a write instruction to modify an empty stream to context register 1014. The apparatus maps, at a hypervisor device, the first address translation context to a second address translation context that is associated with the second security domain of the stream identifier 1016. The apparatus processes a stream of memory access transactions that includes the stream identifier based on at least the first address translation context or the second address translation context 1018.

One or more of the components, steps, features and/or functions illustrated in the figures may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the figures may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein. Additional elements, components, steps, and/or functions may also be added or not utilized without departing from the disclosure.

While features of the disclosure may have been discussed relative to certain implementations and figures, all implementations of the disclosure can include one or more of the advantageous features discussed herein. In other words, while one or more implementations may have been discussed as having certain advantageous features, one or more of such features may also be used in accordance with any of the various implementations discussed herein. In similar fashion, while exemplary implementations may have been discussed herein as device, system, or method implementations, it should be understood that such exemplary implementations can be implemented in various devices, systems, and methods.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. In some aspects, a process may correspond to a method, a function, a procedure, a subroutine, a subprogram, etc. When a process corresponds to a function, its termination corresponds to a return of the function to the calling function or the main function. One or more of the various methods described herein may be partially or fully implemented by programming (e.g., instructions and/or data) that may be stored in a machine-readable, computer-readable, and/or processor-readable storage medium, and executed by one or more processors, machines and/or devices.

Those of skill in the art would further appreciate that the various illustrative logical blocks, modules, circuits, and algorithm steps described in connection with the implementations disclosed herein may be implemented as hardware, software, firmware, middleware, microcode, or any combination thereof. To clearly illustrate this interchangeability, various illustrative components, blocks, modules, circuits, and steps have been described above generally in terms of their functionality. Whether such functionality is implemented as hardware or software depends upon the particular application and design constraints imposed on the overall system.

Within the disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first die may be coupled to a second die in a package even though the first die is never directly physically in contact with the second die. The terms "circuit" and "circuitry" are used broadly, and intended to include both hardware implementations of electrical devices and conductors that, when connected and configured, enable the performance of the functions described in the disclosure, without limitation as to the type of electronic circuits, as well as software implementations of information and instructions that, when executed by a processor, enable the performance of the functions described in the disclosure.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like. As used herein, the term "obtaining" may include one or more actions including, but not limited to, receiving, generating, determining, or any combination thereof.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method for an apparatus that includes a first security domain and at least a second security domain, the method comprising:
   obtaining, at a virtual machine of the first security domain, a stream identifier associated with the second security domain;
   generating, at the virtual machine of the first security domain, a command to map the stream identifier associated with the second security domain to a first address translation context;
   mapping, at a hypervisor device, the first address translation context to a second address translation context that is associated with the second security domain of the stream identifier; and
   processing a stream of memory access transactions that includes the stream identifier based on at least the first address translation context or the second address translation context.

2. The method of claim 1, further comprising:
   identifying, at the hypervisor device, a security domain of at least a second stream identifier already mapped to the first address translation context; and
   validating, at the hypervisor device, the generated command when the security domain of at least the second stream identifier is the same as the second security domain.

3. The method of claim 1, further comprising:
   preventing, at the hypervisor device, the virtual machine from mapping a second stream identifier associated with a third security domain to the first address translation context when the third security domain is different from the second security domain.

4. The method of claim 1, further comprising:
   setting, at the hypervisor device, a context bank attribute register to a fault value when a stream to context register corresponding to the context bank attribute register is empty.

5. The method of claim 1, wherein the apparatus includes a single virtual machine, and wherein the single virtual machine is the virtual machine of the first security domain.

6. The method of claim 1, further comprising:
   validating, at the hypervisor device, the generated command to map the stream identifier when the generated command to map the stream identifier is a write instruction to modify an empty stream to context register.

7. The method of claim 1, wherein the command may be a write instruction to modify one or more registers configured to control memory address translation regimes in a memory management unit (MMU).

8. The method of claim 1, wherein the stream identifier is generated by a master device that is configured to generate a plurality of stream identifiers associated with different security domains.

9. An apparatus comprising:
   a processing circuit that implements a virtual machine of a first security domain; and
   at least one master device of a second security domain, wherein the processing circuit is configured to:
      obtain, at the virtual machine of the first security domain, a stream identifier associated with the second security domain;
      generate, at the virtual machine of the first security domain, a command to map the stream identifier associated with the second security domain to a first address translation context;
      map the first address translation context to a second address translation context that is associated with the second security domain of the stream identifier; and
      process a stream of memory access transactions that includes the stream identifier based on at least the first address translation context or the second address translation context.

10. The apparatus of claim 9, wherein the processing circuit is further configured to:
    identify a security domain of at least a second stream identifier already mapped to the first address translation context; and
    validate the generated command when the security domain of at least the second stream identifier is the same as the second security domain.

11. The apparatus of claim 9, wherein the processing circuit is further configured to:
    prevent the virtual machine from mapping a second stream identifier associated with a third security domain to the first address translation context when the third security domain is different from the second security domain.

12. The apparatus of claim 9, wherein the processing circuit is further configured to:
set a context bank attribute register to a fault value when a stream to context register corresponding to the context bank attribute register is empty.

13. The apparatus of claim 9, wherein the apparatus includes a single virtual machine, and wherein the single virtual machine is the virtual machine of the first security domain.

14. The apparatus of claim 9, wherein the processing circuit is further configured to:
validate the generated command to map the stream identifier when the generated command to map the stream identifier is a write instruction to modify an empty stream to context register.

15. The apparatus of claim 9, wherein the command may be a write instruction to modify one or more registers configured to control memory address translation regimes in a memory management unit (MMU).

16. The apparatus of claim 9, wherein the stream identifier is generated by a master device that is configured to generate a plurality of stream identifiers associated with different security domains.

17. An apparatus that includes a first security domain and at least a second security domain, the apparatus comprising:
means for obtaining, at a virtual machine of the first security domain, a stream identifier associated with the second security domain;
means for generating, at the virtual machine of the first security domain, a command to map the stream identifier associated with the second security domain to a first address translation context;
means for mapping, at a hypervisor device, the first address translation context to a second address translation context that is associated with the second security domain of the stream identifier; and
means for processing a stream of memory access transactions that includes the stream identifier based on at least the first address translation context or the second address translation context.

18. The apparatus of claim 17, further comprising:
means for identifying, at the hypervisor device, a security domain of at least a second stream identifier already mapped to the first address translation context; and
means for validating, at the hypervisor device, the generated command when the security domain of at least the second stream identifier is the same as the second security domain.

19. The apparatus of claim 17, further comprising:
means for preventing, at the hypervisor device, the virtual machine from mapping a second stream identifier associated with a third security domain to the first address translation context when the third security domain is different from the second security domain.

20. The apparatus of claim 17, further comprising:
means for setting, at the hypervisor device, a context bank attribute register to a fault value when a stream to context register corresponding to the context bank attribute register is empty.

21. The apparatus of claim 17, wherein the apparatus includes a single virtual machine, and wherein the single virtual machine is the virtual machine of the first security domain.

22. The apparatus of claim 17, further comprising:
means for validating, at the hypervisor device, the generated command to map the stream identifier when the generated command to map the stream identifier is a write instruction to modify an empty stream to context register.

23. The apparatus of claim 17, wherein the command may be a write instruction to modify one or more registers configured to control memory address translation regimes in a memory management unit (MMU).

24. The apparatus of claim 17, wherein the stream identifier is generated by a master device that is configured to generate a plurality of stream identifiers associated with different security domains.

25. A non-transitory processor-readable storage medium having one or more instructions operational in an apparatus that includes a first security domain and at least a second security domain, which when executed by one or more processors causes the one or more processors to:
obtain, at a virtual machine of the first security domain, a stream identifier associated with the second security domain;
generate, at the virtual machine of the first security domain, a command to map the stream identifier associated with the second security domain to a first address translation context;
map, at a hypervisor device, the first address translation context to a second address translation context that is associated with the second security domain of the stream identifier; and
process a stream of memory access transactions that includes the stream identifier based on at least the first address translation context or the second address translation context.

26. The non-transitory processor-readable storage medium of claim 25, further comprising one or more instructions which when executed by the one or more processors causes the one or more processors to:
identify, at the hypervisor device, a security domain of at least a second stream identifier already mapped to the first address translation context; and
validate, at the hypervisor device, the generated command when the security domain of at least the second stream identifier is the same as the second security domain.

27. The non-transitory processor-readable storage medium of claim 25, further comprising one or more instructions which when executed by the one or more processors causes the one or more processors to:
prevent, at the hypervisor device, the virtual machine from mapping a second stream identifier associated with a third security domain to the first address translation context when the third security domain is different from the second security domain.

28. The non-transitory processor-readable storage medium of claim 25, further comprising one or more instructions which when executed by the one or more processors causes the one or more processors to:
set, at the hypervisor device, a context bank attribute register to a fault value when a stream to context register corresponding to the context bank attribute register is empty.

29. The non-transitory processor-readable storage medium of claim 25, wherein the apparatus includes a single virtual machine, and wherein the single virtual machine is the virtual machine of the first security domain.

30. The non-transitory processor-readable storage medium of claim 25, further comprising one or more instructions which when executed by the one or more processors causes the one or more processors to:
- validate, at the hypervisor device, the generated command to map the stream identifier when the generated command to map the stream identifier is a write instruction to modify an empty stream to context register.

* * * * *